US011958020B2

(12) United States Patent
Belfort et al.

(10) Patent No.: US 11,958,020 B2
(45) Date of Patent: Apr. 16, 2024

(54) ASSAY FOR FILTRATION OF SUSPENDED PARTICLES IN MICROPOROUS MEMBRANES

(71) Applicant: RENSSELAER POLYTECHNIC INSTITUTE, Troy, NY (US)

(72) Inventors: Georges Belfort, Albany, NY (US); Joel L. Plawsky, Albany, NY (US); Corey Christopher Woodcock, Halfmoon, NY (US); Mirco Sorci, Troy, NY (US); Dustin J. Andersen, Seaford, DE (US)

(73) Assignee: Rensselaer Polytechnic Institute, Troy, NY (US)

( * ) Notice: Subject to any disclaimer, the term of this patent is extended or adjusted under 35 U.S.C. 154(b) by 358 days.

(21) Appl. No.: 17/599,657

(22) PCT Filed: Mar. 30, 2020

(86) PCT No.: PCT/US2020/025645
§ 371 (c)(1),
(2) Date: Sep. 29, 2021

(87) PCT Pub. No.: WO2020/205696
PCT Pub. Date: Oct. 8, 2020

(65) Prior Publication Data
US 2022/0161199 A1  May 26, 2022

Related U.S. Application Data

(60) Provisional application No. 62/826,174, filed on Mar. 29, 2019.

(51) Int. Cl.
*B01D 65/10*   (2006.01)
*B01D 61/14*   (2006.01)
(Continued)

(52) U.S. Cl.
CPC .......... *B01D 65/10* (2013.01); *B01D 61/147* (2013.01); *B01D 69/02* (2013.01); *B01D 69/12* (2013.01);
(Continued)

(58) Field of Classification Search
CPC .............. B01D 65/102; B01D 2273/18; B01D 46/0086; B01D 65/104; B01D 65/10;
(Continued)

(56) References Cited

U.S. PATENT DOCUMENTS 10,864,483 B2 * 12/2020 Compton ............... B01D 69/02
10,914,695 B2 *  2/2021 Metzger ................. G01N 1/36
(Continued)

FOREIGN PATENT DOCUMENTS

EP        1862791 A2 * 12/2007  .......... B01D 61/145
WO   WO-2018105721 A1 *  6/2018  .......... B03C 1/0332

OTHER PUBLICATIONS

International Search Report and The Written Opinion of the International Searching Authority, International Application No. PCT/US2020/025645, dated Jun. 22, 2020.
(Continued)

*Primary Examiner* — Andre J Allen
(74) *Attorney, Agent, or Firm* — Murtha Cullina LLP; Anthony P. Gangemi

(57) ABSTRACT

A method of assessing a membrane, including calculating fluid dynamic characteristics of at least one of a membrane and a material to be passed through the membrane, where the material comprises particles; obtaining characteristic of at least one force acting on the particles of the material to be passed through the membrane due to the interaction between the particles and the membrane, the at least one force being an intermolecular force; combining the calculated fluid dynamic characteristic and the obtained characteristics to
(Continued)

assess the flow of the material through the membrane; and optimizing at least one characteristics of the membrane in relation to the material. The membrane includes a plurality of rows and a plurality of teardrop structures arranged in the plurality of rows. The teardrop structures in each row are arranged at substantially the same angle with respect to an anticipated direction of flow through the membrane.

18 Claims, 30 Drawing Sheets

(51) Int. Cl.
    *B01D 69/02*       (2006.01)
    *B01D 69/12*       (2006.01)
    *B01J 20/28*        (2006.01)
    *G01N 15/08*       (2006.01)

(52) U.S. Cl.
    CPC .......... *B01J 20/2804* (2013.01); *G01N 15/08* (2013.01); *B01D 2325/06* (2013.01); *B01D 2325/36* (2013.01); *G01N 2015/084* (2013.01); *G01N 2015/086* (2013.01)

(58) Field of Classification Search
    CPC ...... B01D 35/143; B01D 61/22; B01D 61/12; B01D 61/025; B01D 2311/14; B01D 46/446; B01D 65/02; B01D 61/18; B01D 46/42; B01D 35/00; B01D 46/2418; B01D 61/147; B01D 46/444; B01D 46/10; B01D 63/02; B01D 2201/56; B01D 2321/04; B01D 46/46; B01D 2311/243; B01D 2315/06; B01D 35/147; B01D 53/0454; B01D 63/12; B01D 2201/291; B01D 2311/16; B01D 37/046; B01D 2279/60; B01D 2311/06; B01D 46/442; B01D 2313/18; B01D 2313/44; B01D 63/087; B01D 65/109; B01D 2311/04; B01D 29/60; B01D 37/40; B01D 46/0091; B01D 46/121; B01D 53/228; B01D 61/027; B01D 61/145; B01D 65/08; B01D 2201/52; B01D 2253/102; B01D 2253/108; B01D 2257/93; B01D 2321/185; B01D 29/603; B01D 53/22; B01D 65/108; B01D 69/02; B01D 71/028; B01D 2321/40; B01D 46/543; B01D 61/04; B01D 61/10; B01D 63/066; B01D 65/00; B01D 65/022; B01D 2201/088; B01D 2201/287; B01D 2251/306; B01D 2251/80; B01D 2253/25; B01D 2258/02; B01D 2259/40084; B01D 2259/403; B01D 2265/028; B01D 2273/30; B01D 2279/51; B01D 2311/08; B01D 2311/246; B01D 2313/21; B01D 2313/90; B01D 2321/28; B01D 2323/08; B01D 29/114; B01D 29/52; B01D 29/606; B01D 29/92; B01D 35/14; B01D 46/0098; B01D 46/4254; B01D 46/521; B01D 53/0407; B01D 53/0446; B01D 61/08; B01D 61/28; B01D 65/106; B01D 2239/0654; B01D 2279/30; B01D 2311/24; B01D 2313/08; B01D 2313/13; B01D 2313/903; B01D 2317/02; B01D 2317/04; B01D 2319/06; B01D 2321/08; B01D 2321/162; B01D 2321/164; B01D 2321/22; B01D 37/043; B01D 41/04; B01D 46/0012; B01D 46/44; B01D 61/00; B01D 61/16; B01D 61/20; B01D 61/38; B01D 63/046; B01D 63/08; B01D 63/084; B01D 15/34; B01D 15/36; B01D 17/10; B01D 2201/0446; B01D 2201/0469; B01D 2201/0484; B01D 2201/208; B01D 2201/58; B01D 2239/065; B01D 2239/0695; B01D 2253/1122; B01D 2256/245; B01D 2257/406; B01D 2257/504; B01D 2257/7022; B01D 2258/06; B01D 2259/4009; B01D 2259/4583; B01D 2265/05; B01D 2273/10; B01D 2273/20; B01D 2273/24; B01D 2311/10; B01D 2311/103; B01D 2311/25; B01D 2311/2607; B01D 2311/2626; B01D 2313/025; B01D 2313/086; B01D 2313/20; B01D 2313/243; B01D 2313/26; B01D 2313/345; B01D 2313/36; B01D 2319/022; B01D 2321/16; B01D 2321/168; B01D 2321/18; B01D 2321/2066; B01D 2321/32; B01D 2323/24; B01D 2323/36; B01D 2325/02; B01D 2325/20; B01D 2325/24; B01D 2325/26; B01D 2325/36; B01D 24/4869; B01D 25/001; B01D 25/32; B01D 27/103; B01D 29/09; B01D 29/111; B01D 29/608; B01D 29/96; B01D 35/043; B01D 35/1435; B01D 36/001; B01D 39/00; B01D 39/14; B01D 39/2044; B01D 46/0002; B01D 46/0038; B01D 46/0084; B01D 46/02; B01D 46/12; B01D 46/16; B01D 46/18; B01D 46/20; B01D 46/4272; B01D 46/448; B01D 46/54; B01D 46/62; B01D 53/02; B01D 53/0462; B01D 53/047; B01D 53/94; B01D 59/14; B01D 61/02; B01D 61/026; B01D 61/32; B01D 63/362; B01D 63/021; B01D 63/024; B01D 63/063; B01D 63/068; B01D 63/082; B01D 63/085; B01D 63/10; B01D 63/103; B01D 65/003; B01D 67/0009; B01D 67/0023; B01D 67/0051; B01D 67/0093; B01D 69/00; B01D 69/06; B01D 69/10; B01D 69/12; B01D 71/021; B01D 71/027; B01D 71/10; B01D 71/14; B01D 71/26; B01D 71/38; B01D 71/62; B01D 1/00; B01D 2201/081; B01D 2201/085; B01D 2201/167; B01D 2201/295; B01D 2201/296; B01D 2201/54; B01D 2239/0627; B01D 2271/02; B01D 2279/45; B01D 2313/10; B01D 2313/16; B01D 2313/58; B01D 2313/60; B01D 29/35; B01D 29/6438; B01D 29/66; B01D 35/153; B01D 35/30; B01D 35/301; B01D 35/303; B01D 39/1692; B01D 46/00; B01D 46/0005; B01D 46/0013; B01D 46/2411; B01D 46/2459; B01D 46/247; B01D 46/429; B01D 46/64; B01D 46/84; B01D 46/88; B01D 61/243; B01D 63/067; B01D 69/08; B01D 71/024; B01D 71/0281; B01D 71/36; G01N 15/0826; G01N 15/08; G01N 15/082; G01N 15/0806; G01N 15/088; G01N 33/24; G01N 2015/084; G01N 15/0893; G01N 2015/086; G01N 33/241; G01N 15/0886;
G01N 13/00; G01N 2015/0846; G01N
33/246; G01N 33/346; G01N 2015/0866;
G01N 13/04; G01N 7/10; G01N 7/00;
G01N 33/383; G01N 2015/0873; G01N
33/362; G01N 2015/0833; G01N
2203/0256; G01N 3/12; G01N 33/367;
G01N 3/10; G01N 5/025; G01N
2015/0813; G01N 3/08; G01N 15/02;
G01N 2013/003; G01N 33/42; G01N
2033/0081; G01N 33/38; G01N 15/0618;
G01N 11/00; G01N 5/04; G01N 9/02;
G01N 33/442; G01N 13/02; G01N
15/0272; G01N 2001/2291; G01N 33/26;
G01N 33/2823; G01N 9/26; G01N 1/34;
G01N 21/95692; G01N 7/14; G01N
1/405; G01N 15/06; G01N 21/211; G01N
2203/0019; G01N 2203/0284; G01N
33/00; G01N 9/32; G01N 2001/4016;
G01N 2291/02872; G01N 23/046; G01N
27/048; G01N 33/15; G01N 33/36; G01N
15/0625; G01N 2013/006; G01N
2203/0005; G01N 2223/419; G01N
27/12; G01N 29/07; G01N 33/18; G01N
1/04; G01N 1/08; G01N 1/24; G01N
1/38; G01N 15/0205; G01N 19/04; G01N
2030/626; G01N 21/21; G01N
2203/0085; G01N 2203/0222; G01N
2291/02441; G01N 2291/0256; G01N
2291/0423; G01N 24/08; G01N 24/081;
G01N 27/043; G01N 27/121; G01N
27/60; G01N 29/022; G01N 29/11; G01N
29/449; G01N 3/36; G01N 33/343; G01N
35/00029; G01N 5/045; G01N 7/04;
G01N 1/2226; G01N 11/02; G01N
15/042; G01N 15/1227; G01N
2001/4061; G01N 2015/0049; G01N
2015/045; G01N 2030/009; G01N
2030/025; G01N 2030/062; G01N
2033/0091; G01N 21/3504; G01N
2203/048; G01N 27/02; G01N 30/7233;
G01N 33/28; G01N 33/365; G01N
33/447; G01N 9/36; G01N 1/2202; G01N
1/36; G01N 15/00; G01N 2001/2223;
G01N 2001/225; G01N 2009/028; G01N
2015/0088; G01N 2030/027; G01N
2030/324; G01N 2030/524; G01N
2030/525; G01N 2035/0081; G01N
21/274; G01N 21/33; G01N 21/4738;
G01N 21/85; G01N 21/894; G01N 21/91;
G01N 2203/0016; G01N 2203/0076;
G01N 2203/0226; G01N 2291/0217;
G01N 2291/0231; G01N 2291/0245;
G01N 2291/02863; G01N 2291/0289;
G01N 2291/0426; G01N 2291/044; G01N
27/126; G01N 27/185; G01N 27/221;
G01N 29/14; G01N 29/227; G01N 29/46;
G01N 30/00; G01N 30/02; G01N 30/32;
G01N 30/60; G01N 30/89; G01N 33/34;
G01N 5/00; G01N 1/02; G01N 1/22;
G01N 1/2214; G01N 1/286; G01N
1/4055; G01N 1/4077; G01N 15/0656;
G01N 17/002; G01N 17/008; G01N
19/10; G01N 2001/2241; G01N
2001/383; G01N 2001/4088; G01N
2009/022; G01N 2015/1486; G01N
2030/527; G01N 2033/0096; G01N
2033/245; G01N 2035/00128; G01N
21/27; G01N 21/359; G01N 21/81; G01N
21/8915; G01N 2201/127; G01N
2203/0025; G01N 2203/0037; G01N
2291/02827; G01N 23/2273; G01N
25/66; G01N 27/62; G01N 26/28; G01N
3/00; G01N 3/18; G01N 30/38; G01N
30/7206; G01N 31/22; G01N 33/0047;
G01N 33/14; G01N 35/1095; G01N 9/00;
G01N 1/2035; G01N 1/2205; G01N
1/2247; G01N 1/2258; G01N 1/28; G01N
1/4005; G01N 1/44; G01N 11/06; G01N
11/08; G01N 15/04; G01N 15/0643;
G01N 15/1456; G01N 15/1459; G01N
17/046; G01N 2001/2229; G01N
2001/2261; G01N 2013/0208; G01N
2013/025; G01N 2015/0046; G01N
2015/0061; G01N 2015/0092; G01N
2015/0096; G01N 2015/0662; G01N
2015/0693; G01N 2021/399; G01N
2030/8809; G01N 2035/00198; G01N
21/031; G01N 21/3103; G01N 21/3518;
G01N 21/3581; G01N 21/41; G01N
21/64; G01N 22/02; G01N 22/04; G01N
2203/0044; G01N 2203/0051; G01N
2203/006; G01N 2203/0082; G01N
2203/0087; G01N 2203/023; G01N
2203/0232; G01N 2203/0254; G01N
2203/0272; G01N 2203/028; G01N
2203/0282; G01N 2203/0682; G01N
2291/011; G01N 2291/014; G01N
2291/02836; G01N 2291/02845; G01N
2291/02854; G01N 2291/02881; G01N
2291/0421; G01N 2291/0422; G01N
2291/101; G01N 2291/102; G01N
2291/106; G01N 23/04; G01N 23/083;
G01N 23/09; G01N 23/12; G01N 23/16;
G01N 24/084; G01N 25/02; G01N
25/4866; G01N 25/56; G01N 25/72;
G01N 27/026; G01N 27/04; G01N 27/06;
G01N 27/205; G01N 27/223; G01N
27/226; G01N 27/24; G01N 27/42; G01N
27/423; G01N 27/44756; G01N 27/9046;
G01N 29/069; G01N 29/2418; G01N
29/30; G01N 29/326; G01N 29/42; G01N
3/56; G01N 3/565; G01N 30/06; G01N
30/36; G01N 30/74; G01N 30/82; G01N
31/10; G01N 31/225; G01N 33/0031;
G01N 33/007; G01N 33/0098; G01N
33/1806; G01N 33/32; G01N 33/386;
G01N 33/44; G01N 33/46; G01N
33/4833; G01N 35/1011; G01N 35/1097;
G01N 7/02; G01N 9/04; G01N 9/24;
G01N 1/31; G01N 1/312; G01N 1/4022;
G01N 11/16; G01N 15/065; G01N
15/1031; G01N 15/1429; G01N 17/00;
G01N 2001/2282; G01N 2001/2893;
G01N 2011/008; G01N 2015/0042; G01N
2015/0065; G01N 2015/0687; G01N
2015/1493; G01N 2021/3595; G01N
2021/775; G01N 2021/7773; G01N
2021/7776; G01N 2021/7786; G01N
2021/8472; G01N 2021/8585; G01N 2035/00188; G01N 2035/00217; G01N
21/3563; G01N 21/65; G01N 21/67;
G01N 21/77; G01N 21/84; G01N 21/95;
G01N 2201/1296; G01N 2223/04; G01N
2223/615; G01N 2223/616; G01N
2291/023; G01N 2291/0232; G01N
23/06; G01N 24/082; G01N 25/16; G01N
25/4846; G01N 27/40; G01N 27/72;
G01N 27/74; G01N 3/42; G01N 3/567;
G01N 33/0011; G01N 33/005; G01N
33/025; G01N 33/48; G01N 33/4905;
G01N 33/52; G01N 35/00; G01N 35/10
USPC .......................................................... 73/38
See application file for complete search history.

(56) References Cited

U.S. PATENT DOCUMENTS

| | | | | |
|---|---|---|---|---|
| 11,391,663 | B2* | 7/2022 | Kawano | G01N 15/02 |
| 11,474,021 | B2* | 10/2022 | Yang | G01N 30/36 |
| 2006/0131236 | A1* | 6/2006 | Belfort | B01D 65/08 73/40 |
| 2010/0288029 | A1* | 11/2010 | Ji | B01D 65/10 73/64.54 |
| 2014/0224658 | A1 | 8/2014 | Richardson | |
| 2017/0225127 | A1 | 8/2017 | Peinemann et al. | |
| 2018/0065105 | A1 | 3/2018 | Song et al. | |
| 2018/0250623 | A1* | 9/2018 | Richardson | B01D 46/40 |

OTHER PUBLICATIONS

Breite, D., et al., "Charge Separating Microfiltration Membrane with pH-Dependent Selectivity," Polymers, vol. 11, No. 3, pp. 1-12, Dec. 20, 2018.

Lee, H.D., "Fundamental Study of Microfiltration and Ultrafiltration of Liquid-borne Nanoparticles: Experiments and Models," A Dissertation Submitted to the Graduate School of the University of Minnesota, in Partial Fulfillment of the Requirements for the Degree of Doctor of Philosophy, pp. 1-100, Sep. 2018.

* cited by examiner

ASSAY FOR FILTRATION OF SUSPENDED PARTICLES IN MICROPOROUS MEMBRANES

CROSS REFERENCE TO RELATED APPLICATIONS

This application claims the benefit of U.S. Provisional Patent Application No. 62/826,174, filed Mar. 29, 2019, which is incorporated by reference as if disclosed herein in its entirety.

FIELD

The present technology relates to the field of porous polymer materials, and more particularly, to the performance of microporous membranes.

BACKGROUND

An important and unstudied aspect of porous materials is the link between the microstructure and performance. Porous polymer materials are important in catalysis and in molecular separations such as synthetic membrane filtration and chromatography. These materials are characterized by their microstructure such as pore size distribution ("PSD"), pore connectivity between pores, and surface reactivity. Porous polymer materials are traditionally synthesized through empirical optimization of a phase inversion process. Pore formation occurs when a polymer solution undergoes a precipitation process involving temporal and local fluctuations in conditions that lead to a distribution of morphologies and the resultant PSD, in combination with surface chemistry, controls the efficiency, selectivity, and capacity for membrane filtration and chromatography. In the current state-of-the-art, a desired PSD is targeted through qualitative correlations of parameters in a ternary phase diagram with the process parameters of a membrane production line. This approach is plagued by numerous deficiencies, including a lack of mechanistic understanding of pore formation during the phase inversion process, an absence of guidelines to select solvent and non-solvent, and the impact of process specific variance on the final outcome. Such empirical optimization of porous polymer materials is costly and time-consuming.

Since pressure-driven membrane processes such as reverse osmosis, ultrafiltration, and micro filtration are rate-limited processes, as opposed to equilibrium processes like distillation and adsorption, selectivity depends directly on the relative rates of transport for different species through the membrane. Tracking the simultaneous individual movement of these species inside a membrane to optimize the morphological structure, pore size distribution, and chemical nature is extremely challenging.

Besides microporous membranes, tracking particles inside porous media is of interest in depth filtration, chromatography, water treatment, secondary and tertiary oil recovery, and natural filtration of microorganisms in subsurface aquifers. The aspect ratio of the media differentiates all these 3-dimensional applications with microporous membranes being essentially 2-dimensional thin films. Except for chromatography, all the other media are essentially inorganic and not synthetic porous polymer materials, so the interactions between the particles and the matrix are different. Extensive modeling of fluid-particle transport in these 3D materials has been performed and includes wall and particles interactions, such as long-range electrical double layer and van der Waals' forces. This is not the case with respect to the measurement of particles experimentally within a porous medium to understand how they interact with the medium and how they travel within the medium. Also, most use well-defined geometric models for the adsorptive media, like spheres, cylinders, and constricted tubes. An exception is theoretical single and multiple particle trajectories in a 2-dimensional porous medium, the cross-section of which was reconstructed from micro-CT scans of a real rock. The pores and particles were three orders of magnitude larger than those reported here, and the results were not compared with experimental measurements. Also, particles were forced to enter the medium in one of three conduits, which differs from the present technology in which particles are dragged by the fluid flow into any of the available conduits at the entrance of the porous medium.

Some have related the results of this multi-phase transport phenomena, by defining selectivity, to the concentrations of species in the permeate relative to those in the feed. This lumped parameter approach is sometimes sufficient to characterize the global performance of a particular membrane and process. However, there is a need for improved approaches to rationally determine how to improve the performance (selectivity and capacity) of a membrane through optimal design of the membrane structure and chemistry, since both selectivity and capacity depend directly on these transport rates.

SUMMARY

Accordingly, a first embodiment of the present technology is directed to a method of assessing a membrane. The method includes the steps of: calculating fluid dynamic characteristics of at least one of a membrane and a material to be passed through the membrane, where the material comprises particles; obtaining characteristic of at least one force acting on the particles of the material to be passed through the membrane due to the interaction between the particles and the membrane, the at least one force being an intermolecular force; combining the calculated fluid dynamic characteristic and the obtained characteristics to assess the flow of the material through the membrane; and optimizing at least one characteristics of the membrane in relation to the material.

In some embodiments, the step of calculating fluid dynamic characteristics includes computation of the fluid and particle drag mechanics associated with the material in at least two spatial dimension. In other embodiments, the step of calculating fluid dynamic characteristics includes computation of the fluid and particle drag mechanics associated with the material in three spatial dimension.

In some embodiments, the step of obtaining characteristics of at least one force includes measuring the intermolecular forces between the membrane and the particles.

In some embodiments, the step of optimizing at least one characteristics includes optimizing the capture or release of particles by the membrane.

In some embodiments, the membrane includes a plurality of rows and a plurality of teardrop structures arranged in the plurality of rows.

In some embodiments, the teardrop structures in each row are arranged at substantially the same angle with respect to an anticipated direction of flow through the membrane.

In some embodiments, the membrane further includes that rows of the teardrop structures in which the structures are at an angle of 10° alternate with rows of the teardrop structure in which the structures are at an angle of −10° relative to the anticipated direction of flow through the membrane. In some embodiments, the membrane further includes that rows of the teardrop structures in which the structures are at an angle of 45° alternate with rows of the teardrop structure in which the structures are at an angle of −45° relative to the anticipated direction of flow through the membrane. In other embodiments, the membrane further includes that rows of the teardrop structures in which the structures are at an angle of 70° alternate with rows of the teardrop structure in which the structures are at an angle of −70° relative to the anticipated direction of flow through the membrane. In yet other embodiments, the membrane further includes that rows of the teardrop structures in which the structures are at an angle of 170° alternate with rows of the teardrop structure in which the structures are at an angle of −170° relative to the anticipated direction of flow through the membrane.

In some embodiments, the membrane is formed of a microporous hydrophilic polymer material.

In some embodiments, the material to be passed through the membrane comprises a plurality of $SiO_2$ particles.

According to another embodiment of the present technology, a microporous membrane is provided. The membrane includes a plurality of rows and a plurality of structures arranged in the plurality of rows, wherein the structures in each row are arranged at substantially the same angle with respect to an anticipated direction of flow through the membrane.

In some embodiments, the plurality of structures are teardrop structures. In some embodiments, the membrane is formed of a hydrophilic polymer material.

In some embodiments, the membrane further includes that rows of the structures in which the structures are at an angle of 10° alternate with rows of the structure in which the structures are at an angle of −10° relative to the anticipated direction of flow through the membrane. In some embodiments, the membrane further includes that rows of the structures in which the structures are at an angle of 45° alternate with rows of the structure in which the structures are at an angle of −45° relative to the anticipated direction of flow through the membrane. In other embodiments, the membrane further includes that rows of the structures in which the structures are at an angle of 70° alternate with rows of the structure in which the structures are at an angle of −70° relative to the anticipated direction of flow through the membrane. In yet other embodiments, the membrane further includes that rows of the structures in which the structures are at an angle of 170° alternate with rows of the structure in which the structures are at an angle of −170° relative to the anticipated direction of flow through the membrane.

Further objects, features, and embodiments of the present technology will be apparent from the drawing figures and below description.

BRIEF DESCRIPTION OF THE DRAWINGS

FIG. 7A is an SEM image of 5 μm microporous PES membrane, side view. FIG. 7B is a serial block face ("SBF") image with 100×130 μm mapped flow domain. FIG. 7C is a computational liquid domain.

FIG. 10 is a chart showing surface interactions (adhesion) measured by AFM.

12D) the electrostatic repulsive forces measured between a SiO$_2$ particle and (FIGS. 12B and 12E, respectively) a SiO$_2$ wafer or (FIGS. 12C and 12F, respectively) a hot-pressed PES membrane, as a function of KCl concentration (1-10-100 mM). FIGS. 12B-C show histogram distributions of the adhesion forces (n=400). FIG. 12B shows data sets at 1 nN and 2 nN trigger force. Median values=56, 88, and 243 pN for 1, 10, and 100 mM KCl concentrations, respectively. FIG. 12C shows data set 1 nN trigger force. Median values=138, 333, and 375 pN for 1, 10, and 100 mM KCl concentrations, respectively. FIGS. 12E-F show averaged force-distance profiles measured by approaching a SiO$_2$ particle to the sample (n=50). Scan speed=1 µm/s; trigger force=1 nN. Data (circle) including error bars, and DLVO fits (black line). Fitting parameters were (FIG. 12E) [$\varphi_0$=−39.97 mV], [$\varphi_0$=−22.29 mV], and [$\varphi_0$=−9.33 mV], and (FIG. 12F) [$\varphi_0$=−59.40 mV, A=3.1·10$^{-21}$ J], [$\varphi_0$=−28.15 mV, A~0 J], and [$\varphi_0$=−17.25 mV, A~0 J] for 1, 10, and 100 mM, respectively.

FIG. 13 is a chart showing the flow and pressure fields inside a commercial 5 µm mean pore size porous PES membrane. The observed membrane segment has a thickness of 130 µm from inlet (y-axis, top) to outlet (y-axis, bottom) and width segment of 100 µm (x-axis).

FIG. 16A shows 2D laminar flow field (below) and average velocity (m/s) profiles across the 100 µm width at depths of 10, 50, 90, and 130 µm (dashed lines) from the top face (left). FIG. 16B shows pressure field, where pressure drops from a maximum of 14 kPa (~2 psi) at the top face (left) to nearly zero at the bottom face (right). FIG. 16C shows local electric field in solution in the porous PES membrane.

FIG. 20 is a chart showing a binary system of particles in a membrane with three orientations of teardrops.

FIG. 21A shows the commercial membrane, and FIG. 21B shows the computer-generated teardrop membrane with orientation rotated from the axial direction of the flow of ±170°. 300 1 µm diameter and 150 2 µm diameter particles were simultaneously introduced in the region directly above the top membrane surface. The membrane wall potential was $\varphi_0$=−65 mV, the number of elementary particle charges was z=100 and particle-wall interactions included van der Waals forces (Hamaker constant=6×10$^{-21}$ J). The driving pressure at the top face was 14 kPa (~2 psi). Integrated particle fractions (of the total entering particles) are shown in the top and bottom bars (for particles of 1 and 2 µm diameter, respectively) as a function of depth along the membrane from inlet to exit. 5 µm bins were used. Black bars are for stuck particles. Particle rejections for FIG. 21A are R=0.53 (1 µm) and 0.49 (2 µm), and for FIG. 21B are R=0.03 (1 µm) and 0.04 (2 µm). Rejection was calculated from the particle fraction retained in the membrane at the end of the simulation time relative to the total particles entering the porous membrane. The images were taken after 4 ms. For the computer-generated teardrop membrane, the simulation time was sufficient to complete the filtration experiment. Hence, only "stuck" particle were present within the membrane and rejection was equivalent to the end value in a depth filtration experiment. For the commercial membrane, however, both stuck and slow moving free particles remained in the membrane at the selected time for calculating rejection.

(FIG. 22A)±170° (FIG. 22B)±10° and (FIG. 22C)±45°. 300 1 µm diameter and 150 2 µm diameter particles were simultaneously introduced in the region directly above the top membrane surface. The membrane wall potential was $\varphi_0$=−65 mV, the number of elementary particle charges was z=100 and particle-membrane interactions included van der Waals forces (Hamaker constant=6×10$^{-21}$ J). The driving pressure at the top face was 14 kPa (~2 psi). Integrated particle fractions (of the total entering particles) are shown in top and bottom bars (for particles of 1 and 2 µm diameter, respectively) as a function of depth along the membranes from inlet to exit for the three embodiments. 5 µm bins were used. Particles located near the entrance (left) for all three runs are stuck (statistics unavailable). The images were taken after 1.02, 0.86, and 0.94 ms, respectively, just before the first particle permeated through the membrane. The simulation time was 4 ms.

Figure 23:
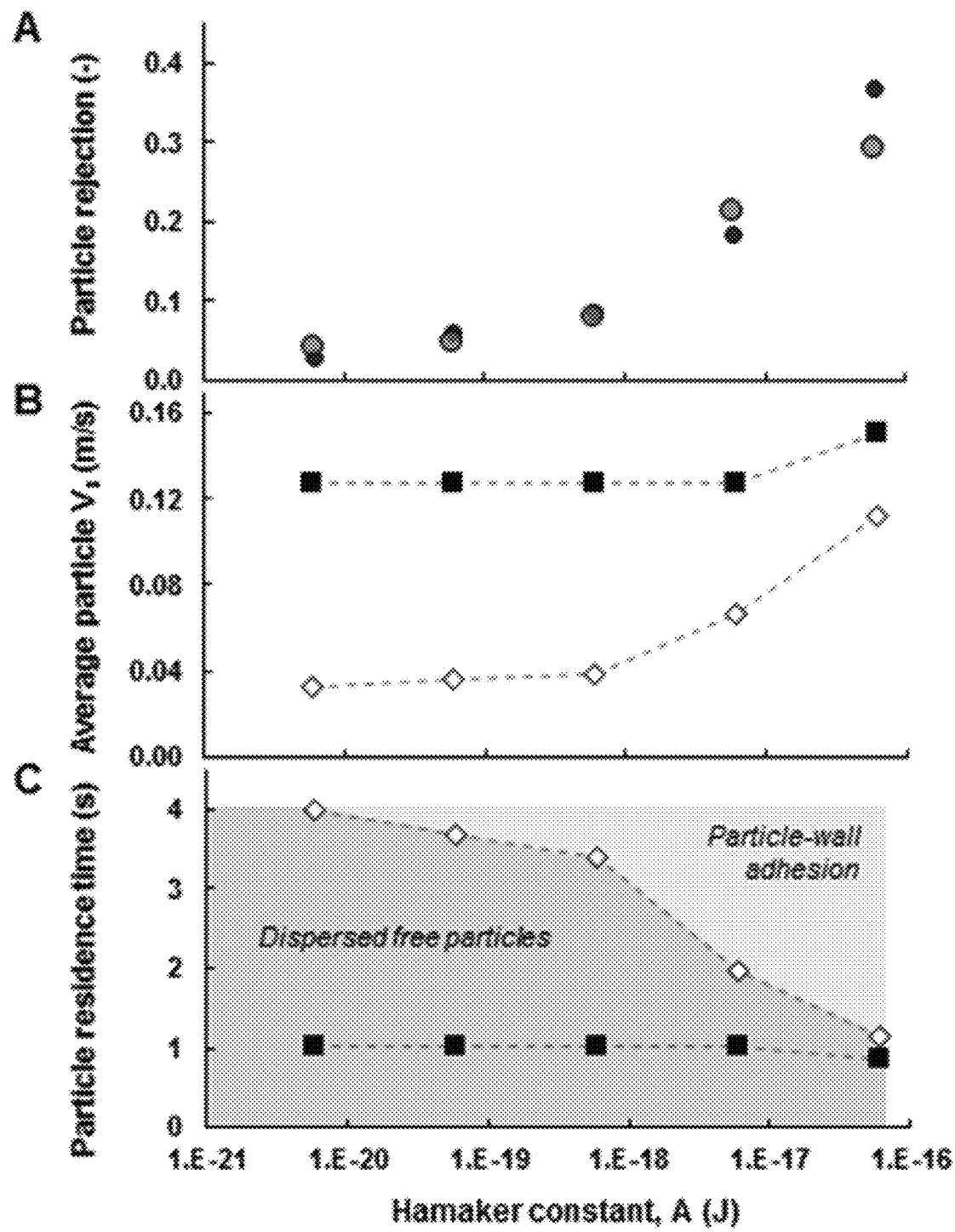

FIG. 23 is a chart showing parameter analysis for varying the Hamaker constant of the membrane/particle interaction. These data were measured for flow in 5 computer-generated teardrop membranes with orientation rotated from the axial direction of the flow of ±170°. The Hamaker constant for the particle-membrane van der Waals interaction was increased from $6 \times 10^{-21}$ to $6 \times 10^{-17}$ J. 300 1 µm diameter and 150 2 µm diameter particles were simultaneously introduced in the region directly above the top of each membrane surface. The membrane wall potential was $\varphi_0 = -65$ mV, the number of elementary particle charges was z=100. The simulation time was 4 ms. FIG. 23A shows particle rejection for both 1 µm diameter (small circle) and 2 µm diameter (large circle) particles. FIG. 23B shows average axial particle velocity. FIG. 23C shows particle residence time for the slowest (diamond) and fastest (square) particle to reach the exit.

Figure 24:
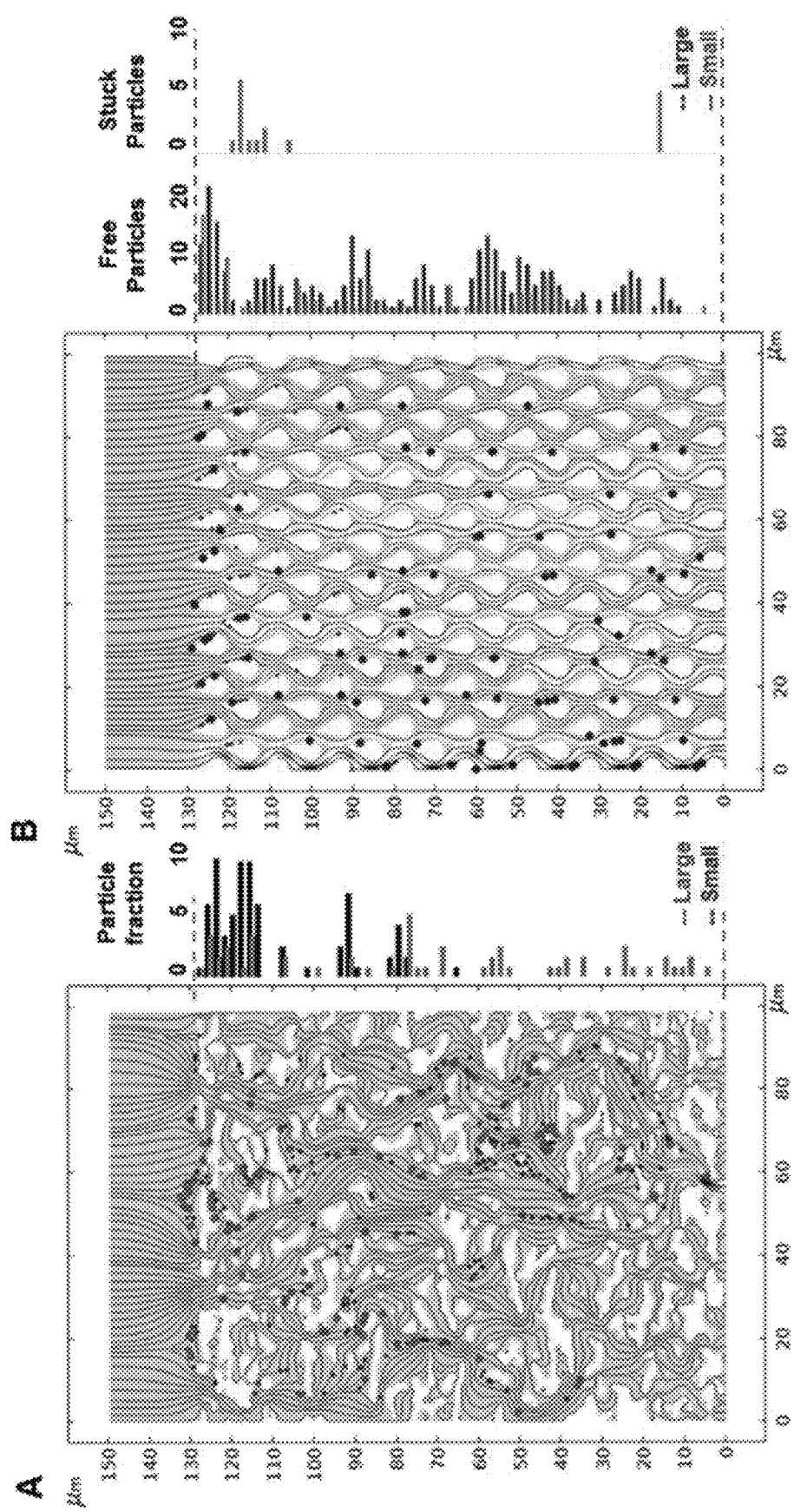

FIG. 24 is a chart showing the comparison between the commercial and hypothetical teardrop structure membranes. Membrane: Computer generated, staggered array of teardrop obstructions. Individual rows of teardrops were rotated ±170° from the vertical. 300 1 µm diameter and 150 2 µm diameter particles were introduced together and simultaneously in a 1 mM electrolyte solution in the area directly above the top membrane surface. The membrane wall potential $\varphi_0 = -65$ mV, the particle charge was Z=−100 and particle-particle interactions included van der Waals (Hamaker constant, $A = 10^{-15}$ J). The driving pressure at the top face was 14 kPa (~2 psi) and the maximum velocity was 0.2 m/s.

Figure 25:
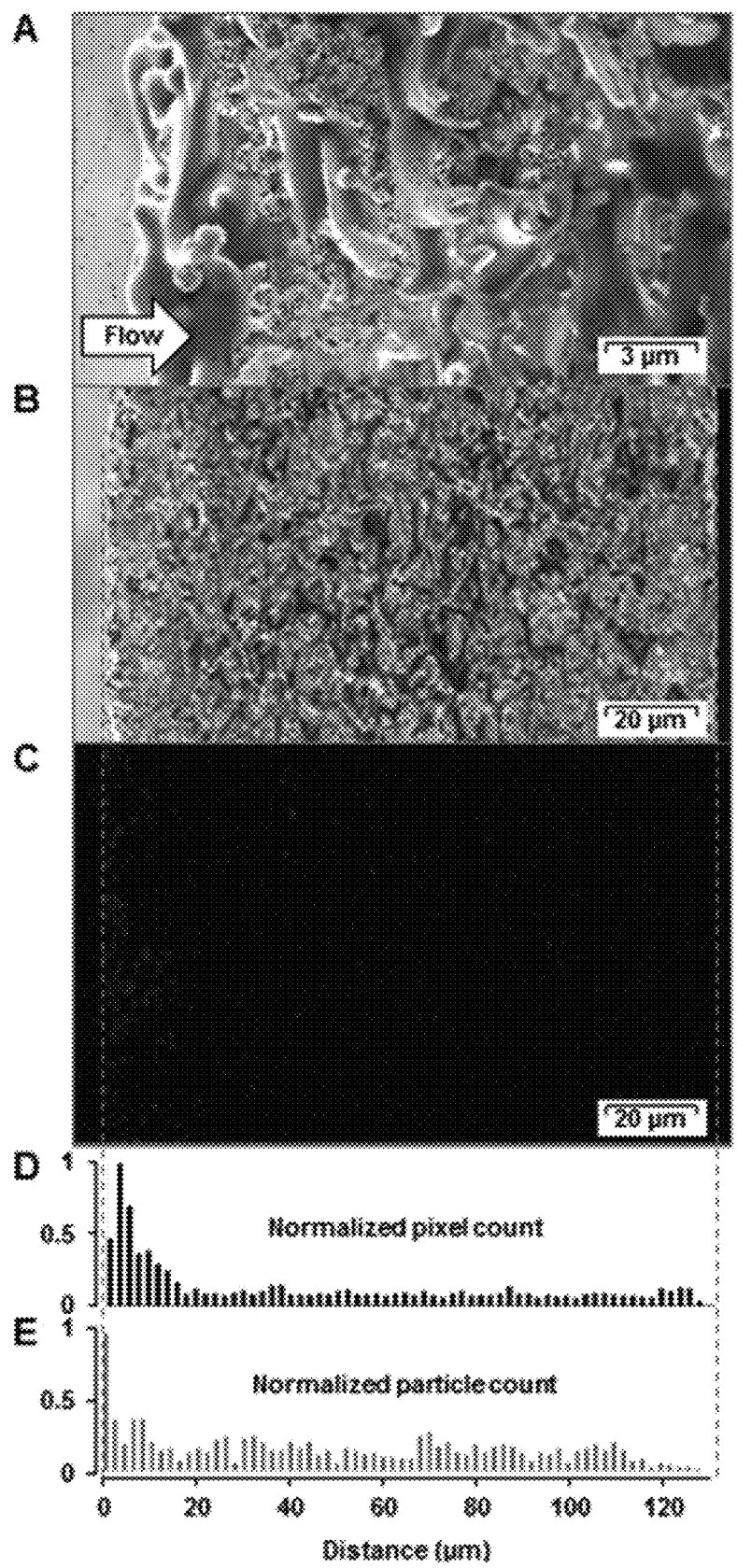

FIG. 25 is a chart showing a qualitative comparison between experiments and model predictions. FIG. 25A shows an overlay of SEM image with EDS signal collected for silicon, shown at sufficient magnification to identify individual 1 µm $SiO_2$ particles, within the cross section of the PES membrane, distinguished from the membrane nodules. FIG. 25B is an SEM image of the entire membrane thickness. FIG. 25C shows EDS signal collected for silicon across the entire membrane. FIG. 25D is an integration (orthogonal to flow) of collected EDS signal in FIG. 25C, reflecting the concentration of silica particles as normalized by the largest peak (normalizing factor=417 counts). Data is binned every 2 µm (40 pixels) along the flow axis. FIG. 25E is a computer-generated profile of predicted particle concentration as a function of membrane depth (y-coordinate) using computational fluid mechanics normalized by the highest particle count (normalizing factor=67 particles). In FIGS. 25D-E, the data were normalized by the highest peak in the data set.

DETAILED DESCRIPTION

Accordingly, embodiments of the present technology address the important link between the microstructure of a membrane and its filtration performance. In some embodiments, a "reverse process" is used, in which the membrane performance is first simulated and optimized in silico by a computational fluid dynamics tool and then a preferred computer-generated structure is synthesized. 2D computational fluid and particle drag mechanics are combined with particle and membrane force measurements in aqueous solutions containing inorganic ions to study particle intrusion and capture in microporous commercial polymer and computer-generated teardrop membranes. Fits of the DLVO theory to force-distance profiles obtained membrane surface potentials needed for the computations. In silico predictions of particle intrusion for a commercial membrane qualitatively agree with experimental filtration measurements using scanning electron microscopy with particle tracking via energy dispersive X-ray spectroscopy. Highlighting the poor flow field uncovered several dominant inhomogeneous 2D flow conduits with large unused regions of the internal pore structure. To guide improved design, new computer-generated microporous teardrop structures that can equalize the flow field, adjust the tortuosity of the flow path, and vary the reactivity of the surface were tested in silico. The main assumptions of the computational model were that 2D flows are a valid description of 3D flows, all forces were applied at the particle center of mass, and forces were calculated based on the physical diameter of the spherical particles. Relatively large pores (~5 micron) and large particles (~1 micron) were selected for easy detection and analysis. Preferably, the computational fluid and particle flow analysis and the inter-surface forces scale independently with size and applies at all classical dimensions (i.e. for nano, ultra, and microfiltration). Assumptions for the intermolecular force measurements were that electrostatic and van der Waal's forces dominated and hence that the DLVO theory was valid, and that the zeta potential values were close to those at the wall (i.e. surface potential). In particular, the DLVO was applied to ideal geometries: a sphere (i.e. AFM probe) near to a flat surface (i.e. either a silica wafer or a hot pressed PES membrane). This computational fluid mechanics-based tool can be used to characterize membranes for separation performance and guide improved design, synthesis and testing of new microporous membranes.

Accordingly, the difficulty of designing a synthetic polymer membrane with a desirable pore size distribution, specified morphology, and surface chemistry is a major deficiency that seriously limits progress in optimizing filtration selectivity and capacity (permeation flux). To help address this challenge, the concept of selectivity and hence relative transport rates of competing solutes (or particles) into and through a membrane needs quantitative analysis. In some embodiments, 2D computational fluid and particle drag mechanics are combined with intermolecular force measurements to study particle intrusion and attachment in microporous polymer membrane (i.e. microfiltration) pores. In other embodiments, 3D computational fluid and particle drag mechanics are combined with intermolecular force measurements to study particle intrusion and attachment in microporous polymer membrane (i.e. microfiltration) pores. In some embodiments, the predictions from this theoretical approach are combined qualitatively with experimental measurements of particle intrusion into microporous polymer membranes using scanning electron microscopy with particle tracking via energy dispersive X-ray spectroscopy.

Some embodiments of the present technology provide new insight on internal particle capture with qualitative agreement with the experiments, and the existence of several dominant 2D flow conduits instead of even fluid flow with large regions of the internal pore structure unused. Some embodiments of the technology show 2D results showing that the internal morphological structure of commercial microporous membranes could be poorly designed for optimal particle capture or release and hence selectivity and permeation flux. Some embodiments of the technology include improved filtration performance, via one or more synthetic morphological structures based on a teardrop design that show even exit axial flow across the horizontal axis and separation between small and large particles, both of which were not observed for simulated transport in commercial microporous membranes.

According to some embodiments of the present technology, the drag and adhesion of point-particles in a complex 2-dimensional flow-field are tracked through a realistic pore structure of a microporous commercial membrane using wall potential from zeta potential measurements. The interaction forces are calculated as if the particles had physical size, charge, and mass. However, only the center of mass of the particles are tracked, not their surface. These interactions are obtained, in some embodiments, using zeta potential and atomic force microscopy in force mode measurements as a function of ionic strength. In some embodiments, the particle hold-up data predicted by the computational model is compared with those of silica particle intrusion measurements.

Figure 1:
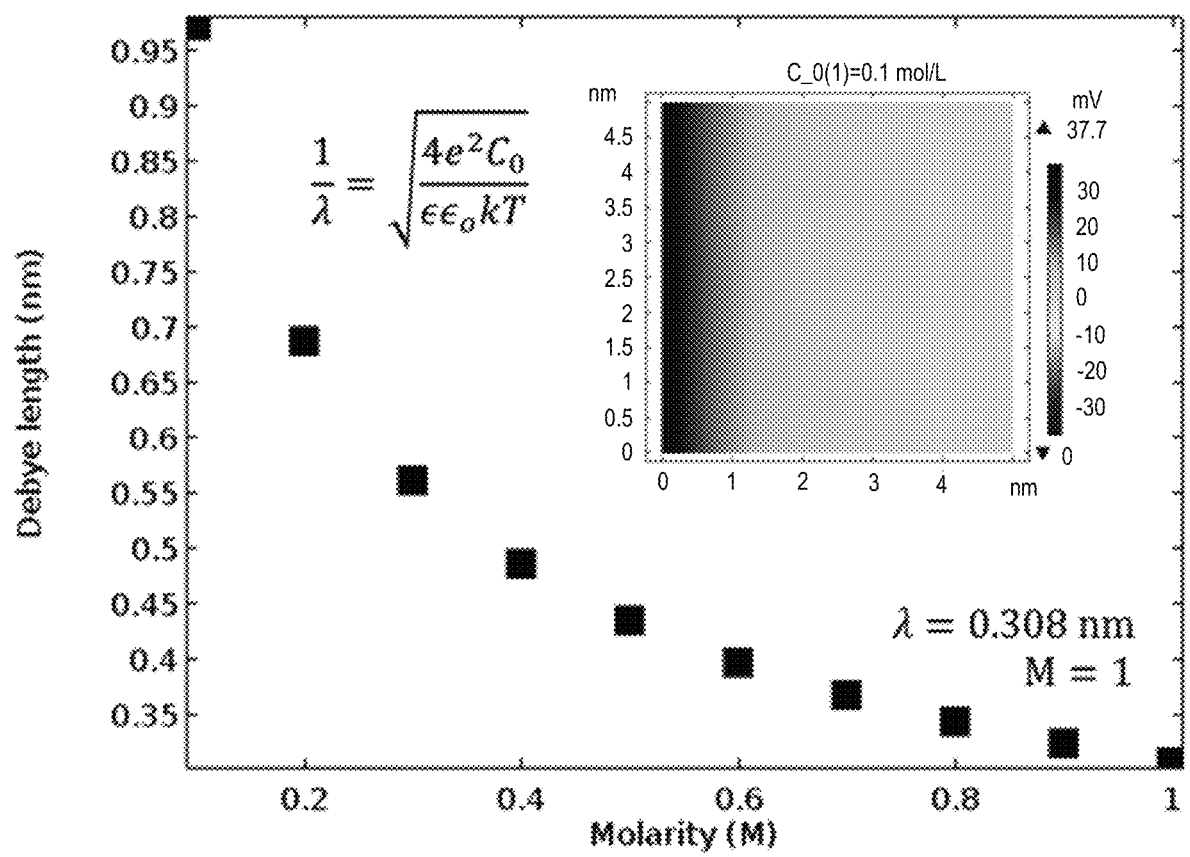
FIG. 1 is chart showing a diffuse double layer with Debye length as a function of dilute ionic species concentration. The insert shows the potential drop in solution from a wall potential, $\varphi_0 = 37.7$ mV.
Figure 2:
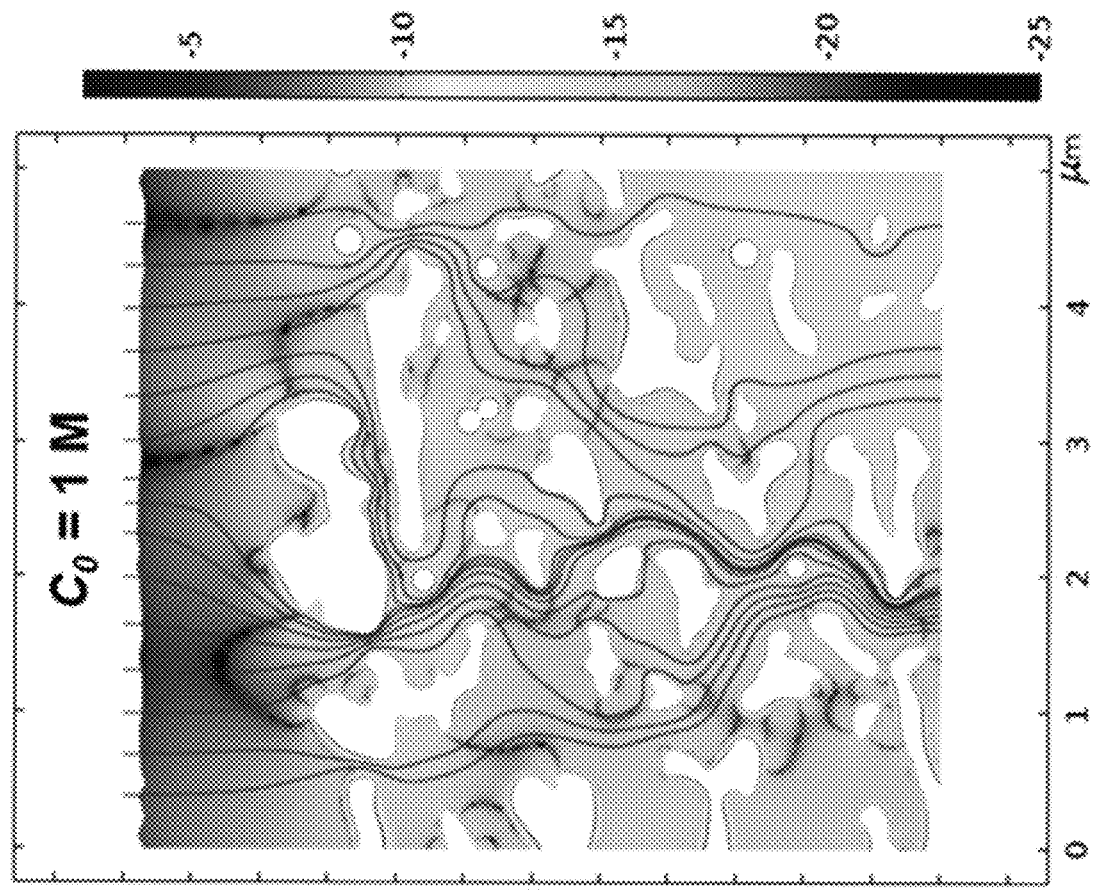
FIG. 2 is a chart showing a voltage solution potential where the surface (key) is equal to log(V), and streamlines are for the velocity field.
Figure 2:
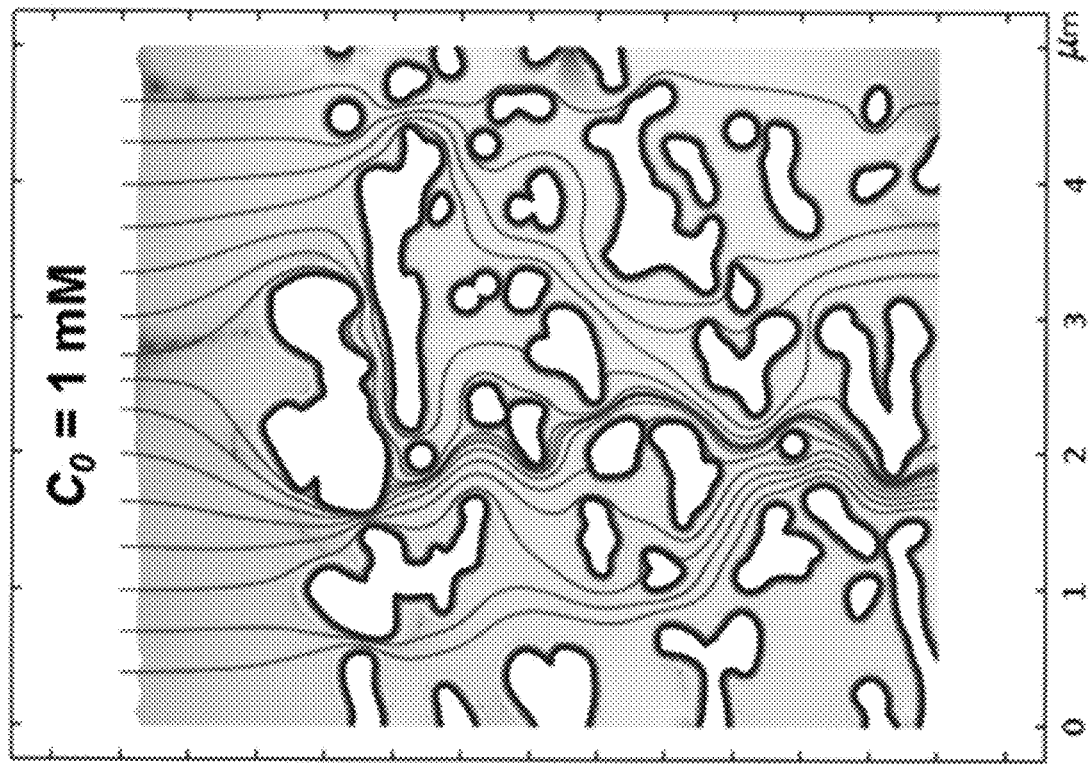

In some embodiments of the present technology, a finite element model was developed to track the paths of particles through two commercial poly(ether sulfone) ("PES") membranes (with 0.2 and a 5 μm mean pore size) and to simulate the interactions of the particles with one another and with the membrane surface. For the commercial PES membranes, the domain geometry was derived from their SEM micrographs. Additionally, hypothetical membrane structures were developed with teardrop designs. AutoCAD software was used to trace images from SEM images and separate the solid membrane regions from the open pore space. The pore space was then filled with water containing a 1:1 binary salt, like KCl, in concentrations ranging from 0.1-100 mM. The model coupled hydrodynamics with electrostatics (−65 mV (from zeta potential measurements) and estimated −80 mV wall potential), van der Waals interactions, and dilute species transport to describe the flow field, the electric field and the distribution of ions in the domain, as shown in FIGS. 1-2. Particles with point charge (−100 mV) were periodically introduced into the flow field outside the top face of the membrane and subjected to hydrodynamic, electrostatic, and van der Waals forces.

Figure 3A:
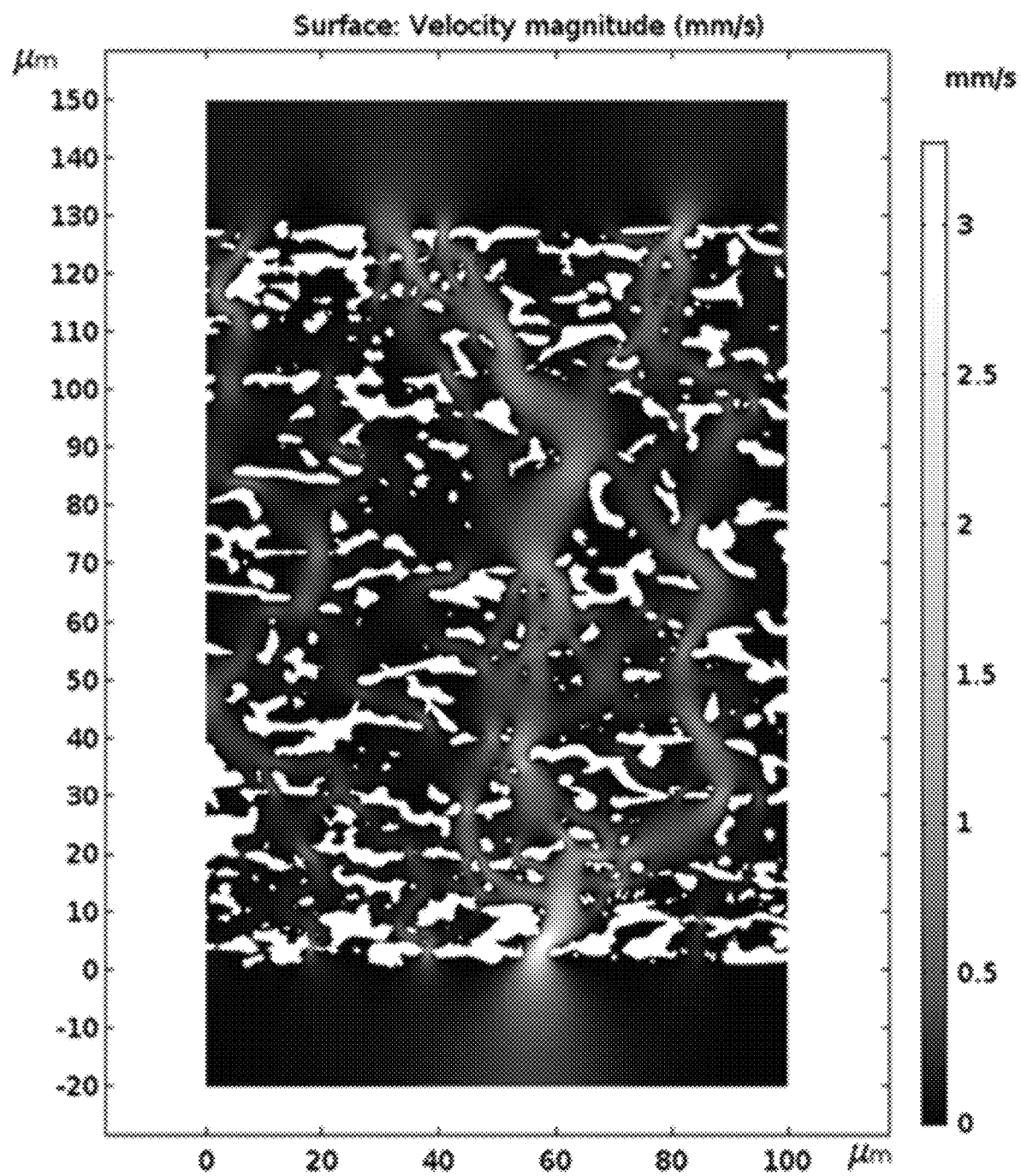
FIG. 3A shows a 2D laminar flow field, and FIG. 3B shows a pressure field, where pressure drops from a maximum of 50 Pa at the top face to nearly zero at the bottom face.
Figure 3B:
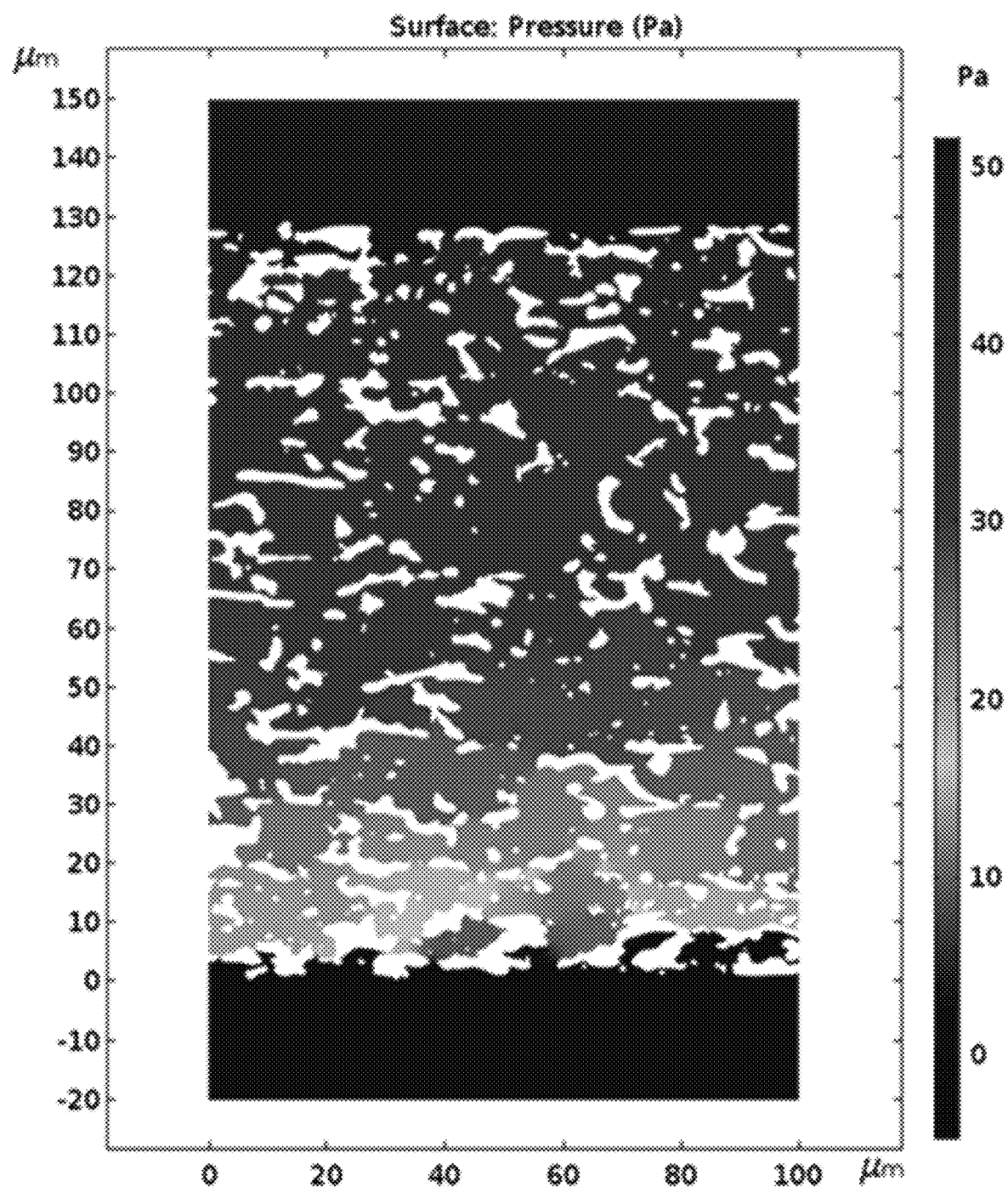
FIG. 3 is a chart showing a laminar flow solution. The observed 5 (μm mean pore diameter PES membrane segment has a thickness of 130 μm from inlet (y-axis, top) to outlet (y-axis, bottom) and width segment of 100 μm (x-axis).

In some embodiments, the flow field was simulated as pressure driven flow with a very low pressure drop of 50 Pa, as shown in FIG. 3, and a realistic pressure drop of 14 kPa (~2 psi) derived from the membrane filtration experiments. A slip condition was used on the overall domain sidewalls, since the SEM image represented only a small slice of the total membrane. The electric field within the pore space of the membrane was calculated by specifying zero charge boundary conditions on the overall, external boundaries of the domain and using the experimental, zeta potential measurements reported herein to set the potential on all the internal membrane surfaces. The ion distribution was simulated using zero flux boundary conditions on all surfaces and setting an initial salt concentration in the water with a constant salt concentration on the upper boundary leading into the top membrane surface. A steady-state simulation was first performed to set the underlying flow, electric, and concentration fields prior to introducing the particles.

In some embodiments, the simulations were run in 2D to develop the model formulation in a simpler geometry first, understand what forces were important in the system, determine how big the models would get when using a real membrane geometry, determine the minimum feature scales needed to include from the membrane geometry, and determine how much time it would take to simulate the interactions of many individual particles with the membrane in detail. In some embodiments, the flow field is solved for in a 3D geometry by deriving 3D geometries from the SEM slices, importing them into the simulation, and creating a 3D simulation of the entire system with a volume roughly 100 microns on a side.

In some embodiments, the microporous membranes used were hydrophilic PES 0.2 and 5 μm mean pore size membrane. The monodispersed silica ($SiO_2$) particles were 5% w/w in water with a diameter of 0.25 and 1 μm. A $SiO_2$ wafer was used for the force measurements. Ultra-pure water (resistivity~18 MΩ) was used for all the experimental work.

Scanning electron microscopy ("SEM") was used to analyze the morphology of the top and bottom faces and the cross-section (edge) of the commercial microporous structure of the PES membranes. In some embodiments, to facilitate imaging of the membrane and reduce beam-induced damage, a beam accelerating voltage of 5 kV was used and the non-conductive membranes were sputter coated using an Au/Pd alloy. The SEM is capable of recording images with up to 4000 pixels in the vertical direction, meaning that the images typically contain nearly 30 pixels per micron across the entire membrane (130 μm thickness), and thus the particles were identifiable from images of the entire membrane. However, the membrane also has 1 μm in diameter round nodules, which made more complex discriminating between particles and membrane. Unfortunately, the membrane and the particles are also similar in atomic weight, suggesting that discrimination through background electrons ("BSE") was also not practical, with most of the BSE signal variation coming from sample geometry rather than atomic number. However, the particles are made of $SiO_2$, and while the membrane contains oxygen, it does not contain silicon. Thus, the $SiO_2$ particles were discriminated from the PES nodules using characteristic X-rays using Energy Dispersive X-ray Spectroscopy ("EDS").

In some embodiments, EDS maps were generated to distinguish the positions of $SiO_2$ particles from membrane nodules, since the silicone characteristic X-ray peak does not overlap significantly with the X-ray peaks of the PES membrane of the Au/Pd coating. The EDS maps were produced with the entire thickness in view (130 μm thickness) and contained around 2,000 pixels in the axial (flow) direction, which corresponded to about 15 pixels per micron across the entirety of the membrane. As the beam was scanned across the sample, individual spectra were generated for each pixel. The spectra consist of characteristic X-ray peaks overlaid on top of the background X-ray radiation (called braking radiation). The software then provides a pixel by pixel determination of the presence of Si atoms by comparing the X-ray background to the Si peak. Stochastic variations in the background X-ray intensity can lead to false positives, but the result is sufficient for distinguishing particles from the PBS membrane. Since the penetration depth of the particles into the membrane was of interest, the Si elemental maps were integrated orthogonally to the flow direction of the membrane. Each point in the integration provides an estimate of the area of the membrane covered by particles for each line of the Si elemental map along the direction orthogonal to the flow direction. These integrations were then binned, reducing the resolution along the flow direction, but also reducing the noise in the data.

In some embodiments, an SEM equipped with a SBF/SEM set-up was used for sequential imaging of the membranes in cross section. An in situ ultramicrotome inside the SEM chamber and a solid-state directional backscatter detector attached to the pole piece allow for the sequential sectioning and imaging of the resin embedded membrane block-face. To increase the backscatter signals, in some embodiments, membranes were stained with osmium tetroxide for 2 hours. They were then embedded in an epoxy resin and cured in oven at 70° C. overnight. The samples embedded in resin were fixed to an aluminum stub with epoxy glue. The block was trimmed with an ultramicrotome into a cubic shape. To reduce charging during imaging, the lateral sides of the block face were coated with colloidal silver glue and the block face was sputter-coated with 10 nm platinum/palladium. In some embodiments, the serial block face images were acquired in an automated mode and in low vacuum mode under the following conditions: accelerating voltage 3 kV, beam current 100 pAmp, resolution 1,012× 884, pixel size 195 nm, slice thickness 100 nm, and chamber pressure 40 Pa.

In some embodiments, force measurements were performed using an atomic force microscope, and the collected data were analyzed. The membranes and silica wafers were scanned in force mapping mode using silicon nitride cantilevers carrying a 1 μm silica sphere, and nominal spring constants of 20 or 60 pN/nm. The cantilevers were calibrated before each experiment. A force map data set consisted of an array of 400 (20×20) force measurements, scanning in contact mode an area of 20×20 μm², with each pixel point spanning an approximate width of 1 μm in both X and Y directions. Different parameters were varied: (i) the trigger force was 0.2-0.5-1 nN; (ii) the scanning speed was 0.5-1-2 μm/s; (iii) the samples were immersed in $H_2O$ or 1-10-100 mM KCl in $H_2O$. All measurements were performed at 22° C.

In some embodiments, membrane surface zeta potential was determined from the measured streaming potential and/or streaming current using a commercial electrokinetic analyzer. Two 20×10 mm² hot pressed or as received membrane samples were fixed on the rectangular planar sample holders of an adjustable gap cell using double-sided adhesive tape. Before each measurement, the samples were rinsed 5 times with the working electrolyte solution. Four measurements were collected for each operating condition. All measurements were performed at 22° C., the gap distance was kept constant and equal to ~100 μm unless specified, the electrolyte solution was 1 mM KCl in $H_2O$, pH ~6.5.

Figure 4:
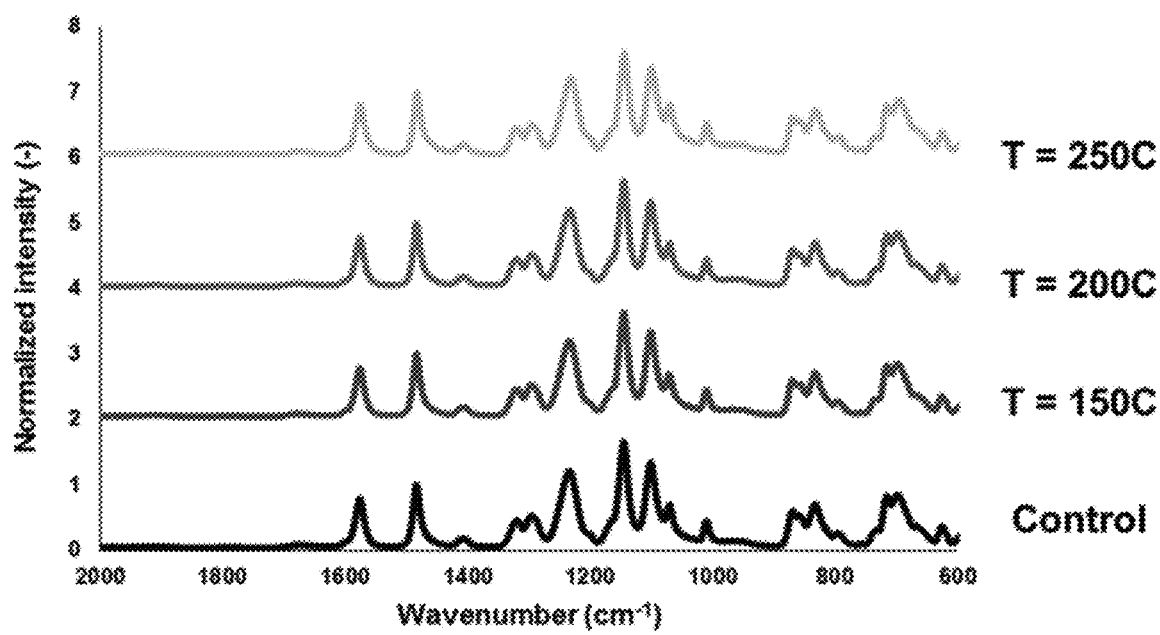
FIG. 4 is a chart showing an ATR-FTIR spectra of hot-pressed membranes at different temperatures. ATR-FTIR spectra of 0.2 μm mean pore size PES membranes pressed at different temperatures. Control=Membrane as received (not pressed) at RT. Data were normalized using the peak at 1,484 cm$^{-1}$ (aromatic C=C) as a reference.

In some embodiments, each PES membrane sample was cut into 2×2 cm² squares and sandwiched between two kapton films. Stainless steel plates and Carver Press were equilibrated at the desired temperature for at least 15 minutes. Then, each membrane was pressed under 2 ton load for 5 minutes at 150° C., 200° C., and 250° C., as shown in FIG. 4.

In some embodiments, Fourier Transform Infrared Spectroscopy ("ATR-FTIR") was used to detect the structure of PES membranes. FTIR spectra were obtained at a 0.48 $cm^{-1}$ data spacing, and 16 scans were performed per sample in the wavenumber range of 400-4,000 $cm^{-1}$. A quadratic function was fitted to each spectrum and subtracted to perform baseline correction.

In some embodiments, filtration experiments with 1 μm silica particles were performed using a stirred cell. Membrane coupons were cut to fit the cells. A 10 mL particle solution was prepared by diluting the 5% w/w stock particle solution in the working buffer (e.g., $H_2O$ or 1-10-100 mM KCl in $H_2O$) 1,000-fold and sonicated 2 minutes in a water bath sonicator, to disperse the particles. Gentle magnetic stirring was included to minimize concentration polarization. Filtration was performed at 14 kPa (~2-3 psi), using pressurized $N_2$. For mixtures, 0.25 μm silica particles were added to the suspension of 1 μm silica particles for the same total concentration of particles as with just the single particle runs.

Experiments to characterize and define the pore morphology and to estimate the intermolecular forces with changing salt (KCl) concentration, such as the surface energy (i) of PES membranes, (ii) between $SiO_2$ particles, and (iii) between $SiO_2$ particles and PES membranes, were needed for the computational predictions of fluid and particle movement passing through a microporous PES membrane. In some embodiments, computational fluid and particle dynamics with double layer effects (DLVO theory) to track particle intrusion into and attached onto the internal pore structure of these PES membranes, were used to estimate mean particle number as a function of distance from the top membrane surface and dominant flow paths within the membrane. A qualitative comparison between the computational predictions and the experimental results of the mean particle number obtained by microfiltration of a $SiO_2$ particle suspension was performed.

Figure 5:
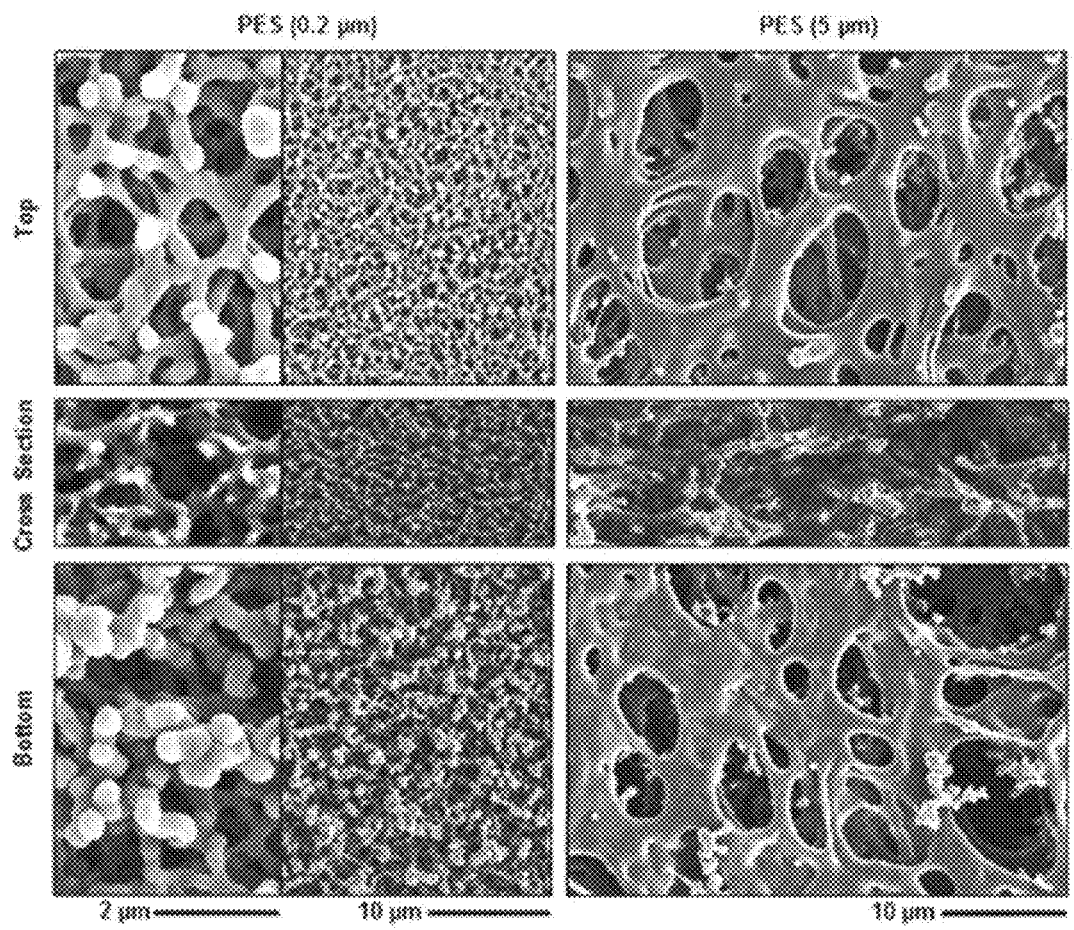
FIG. 5 is an SEM image of PES microporous membranes. The left and right columns are for 0.2 and 5 μm mean pore size PES membranes, respectively. The top, middle, and bottom rows are face-on, cross-section, and face-on views, respectively.
Figure 6:
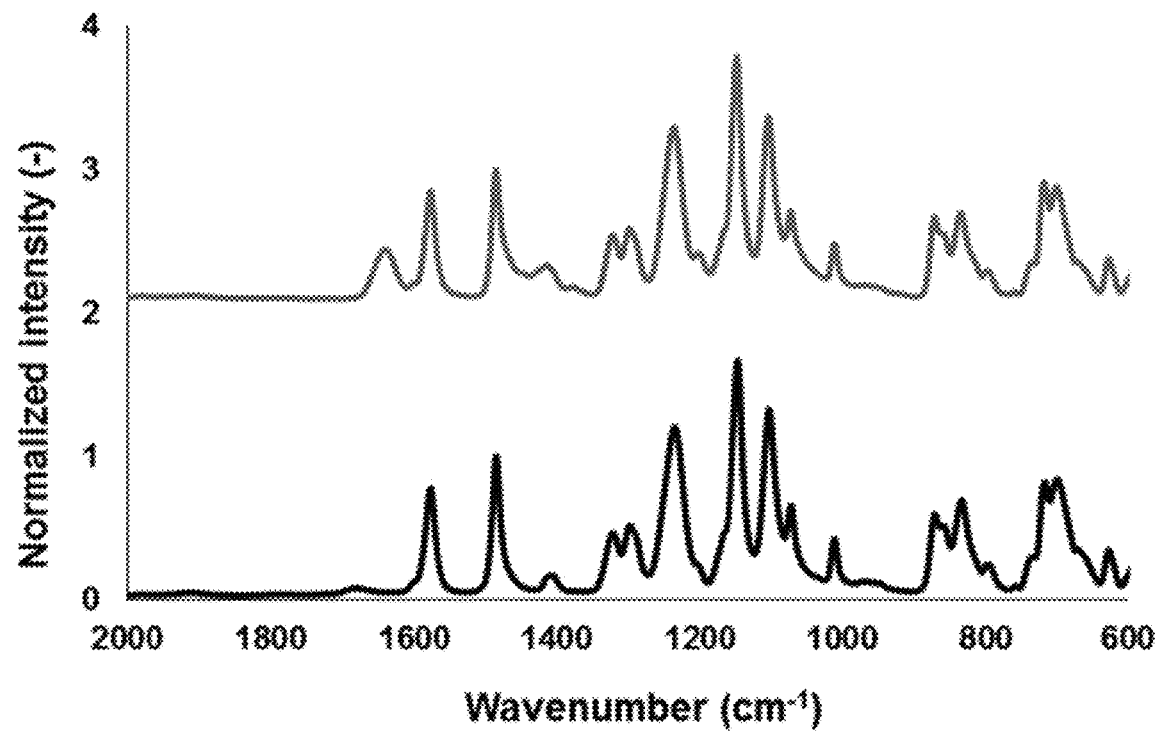
FIG. 6 is a chart showing an ATR-FTIR spectra of different pore size membranes. ATR-FTIR spectra of 0.2 μm (bottom) and 5 μm (top) mean pore size PES membranes. Data were normalized using the peak at 1,484 cm$^{-1}$ (aromatic C=C) as a reference. The one peak difference at −1,640 cm$^{-1}$ is likely due to the addition of an additive like N-vinyl-2-pyrrolidone, often used in PES membranes, which has an intense absorbance at 1,665 cm$^{-1}$ (stretching vibration of C=O) or some residual solvent like N,N-dimethyl acetamide, often used to dissolve PES, which has a characteristic peak at 1,638 cm$^{-1}$ (C=O in the amide group).
Figure 7:
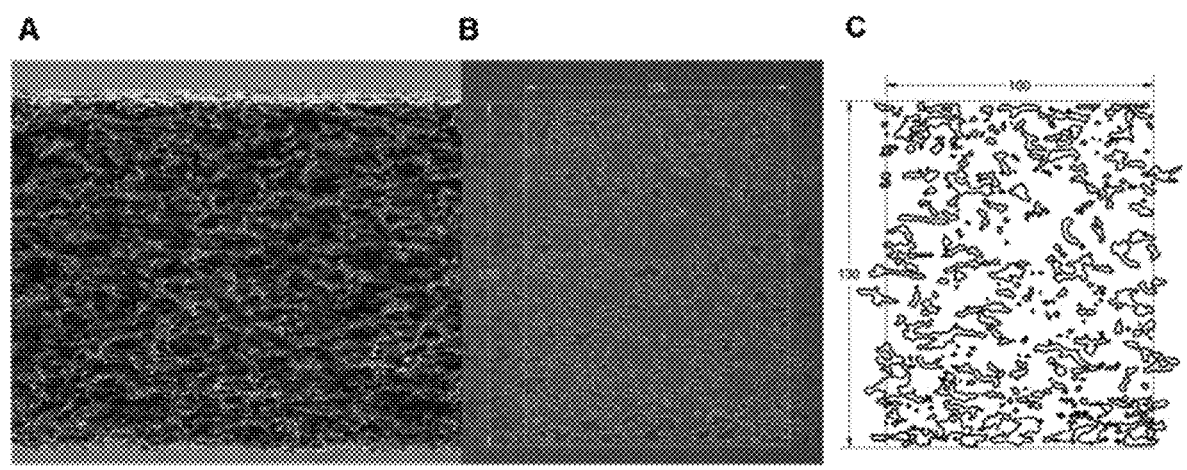
FIG. 7 shows flow domain mapping.

Top face-on, cross-section (edge), and bottom face-on SEM images of the 0.2 and 5 μm mean pore size PES membranes are shown in FIG. 5. Although the membranes are similar in chemistry, as shown in FIG. 6, their morphologies are different. The morphology of the μm mean pore size membrane appears to be similar for top, edge and bottom views, while for the 5 μm mean pore size membrane these views show a different morphology. A perforated skin is present on the top and the bottom face, while a nodular porous structure is observed for the cross-section for the 5 μm mean pore size membrane. A 2D cross section of each PES membrane was then used as an image template for the computational laminar fluid flow and particle drag, as shown in FIG. 7.

Figure 8:
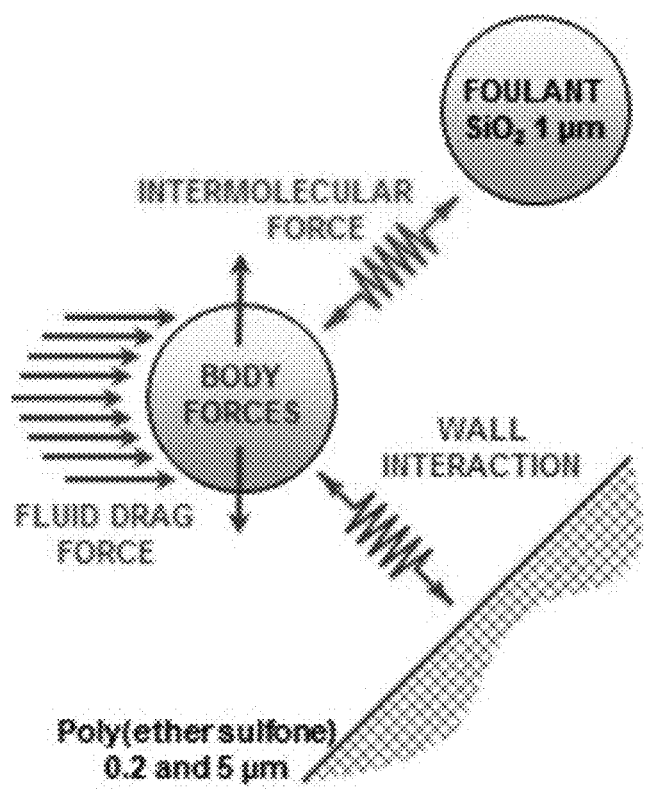
FIG. 8 is a schematic view of intermolecular forces. Particle-membrane interactions were measured experimentally, while only particle-membrane interactions were considered by the computational fluid and particle dynamics analysis. Tracking particle intrusion into and attached onto the internal pore structure of these PES membranes were obtained experimentally (SEM) and computationally.
Figure 9:
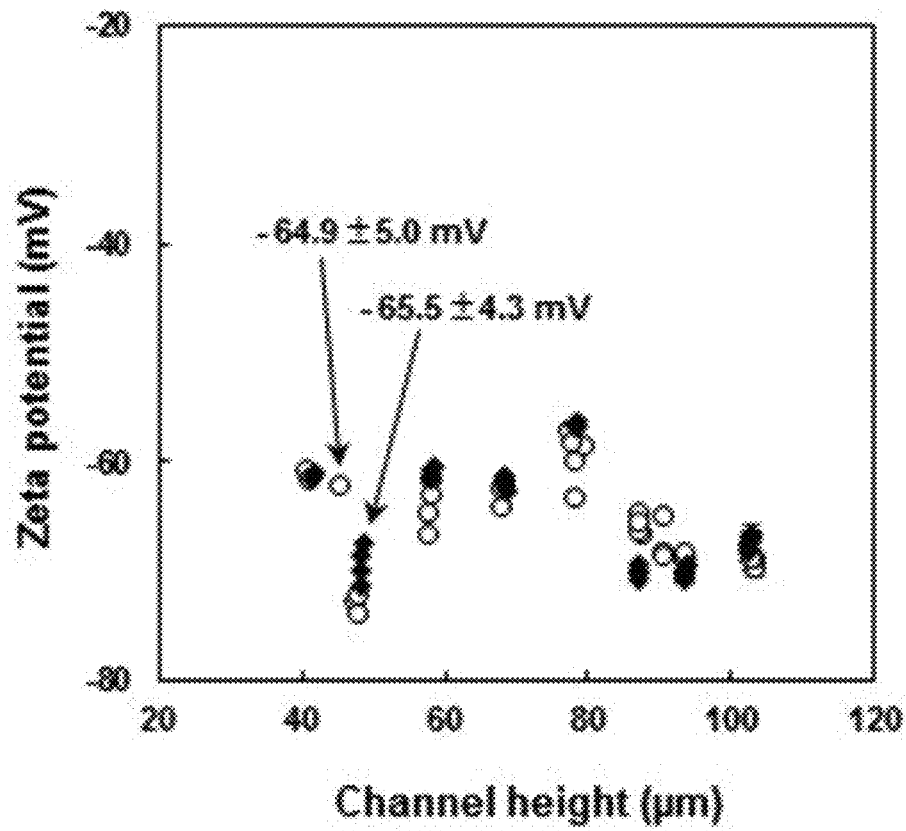
FIG. 9 is a chart showing zeta potential measurement of PES membranes. Zeta potential estimates using both steaming potential (solid diamonds) and streaming current (open circles). The data (n=30) show that using a hot-pressed membrane, the two methods gave a similar result, independent of the channel height.

FIG. 8 is a schematic showing the intermolecular forces involved in some embodiments of the analysis. Regarding the surface energy of the 5.0 μm mean pore size PES membrane: zeta potential measurements of microporous membranes using an electro-chemical test cell gave questionable results with the 5 μm mean pore size microporous membrane. In particular, when comparing zeta potentials obtained from streaming potential versus streaming current, the measurements were inconsistent between the two methods due to undesired convective flow in the porous membranes. As a result, these measurements were re-run at 1 mM KCl as function of the gap-width with a non-porous hot-pressed PES membrane and found that the two methods (streaming potential and streaming current) gave similar consistent results, as shown in FIG. 9. The streaming potential and streaming current gave zeta potential values of −64.5±5 and −65.5±4.3 mV, respectively. Thus, for the computation of particle-surface interaction, −65 mV and −80 mV were selected as estimates of the membrane surface potential of the internal pore surface.

Figure 10A:
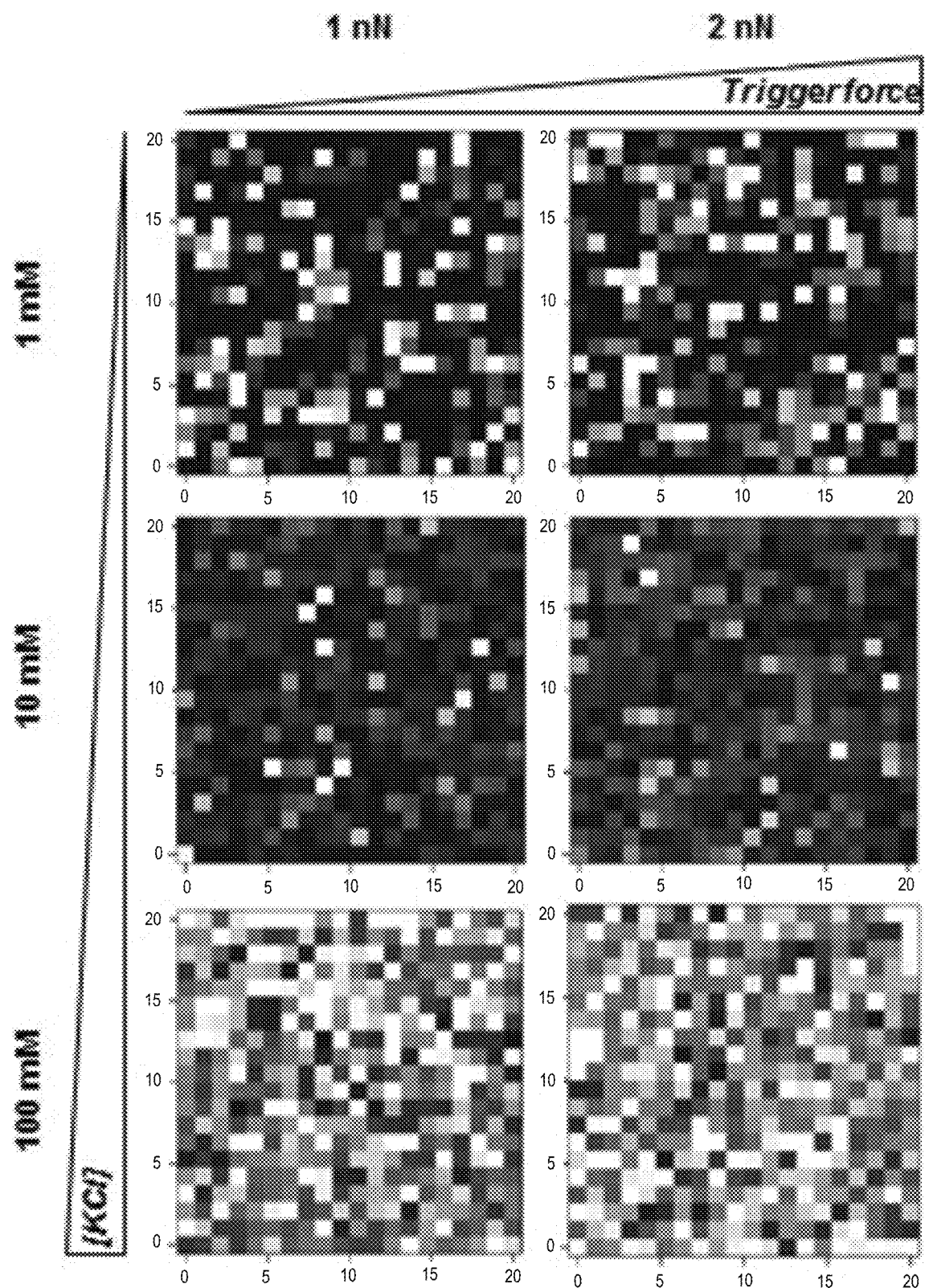
FIG. 10A shows force maps between a $SiO_2$ particle and a $SiO_2$ wafer as a function of trigger forces (1-2 pN) and KCl concentration (1-10-100 mM). White pixels indicate high adhesion, while black pixels indicate low adhesion (n=400).
Figure 10B:
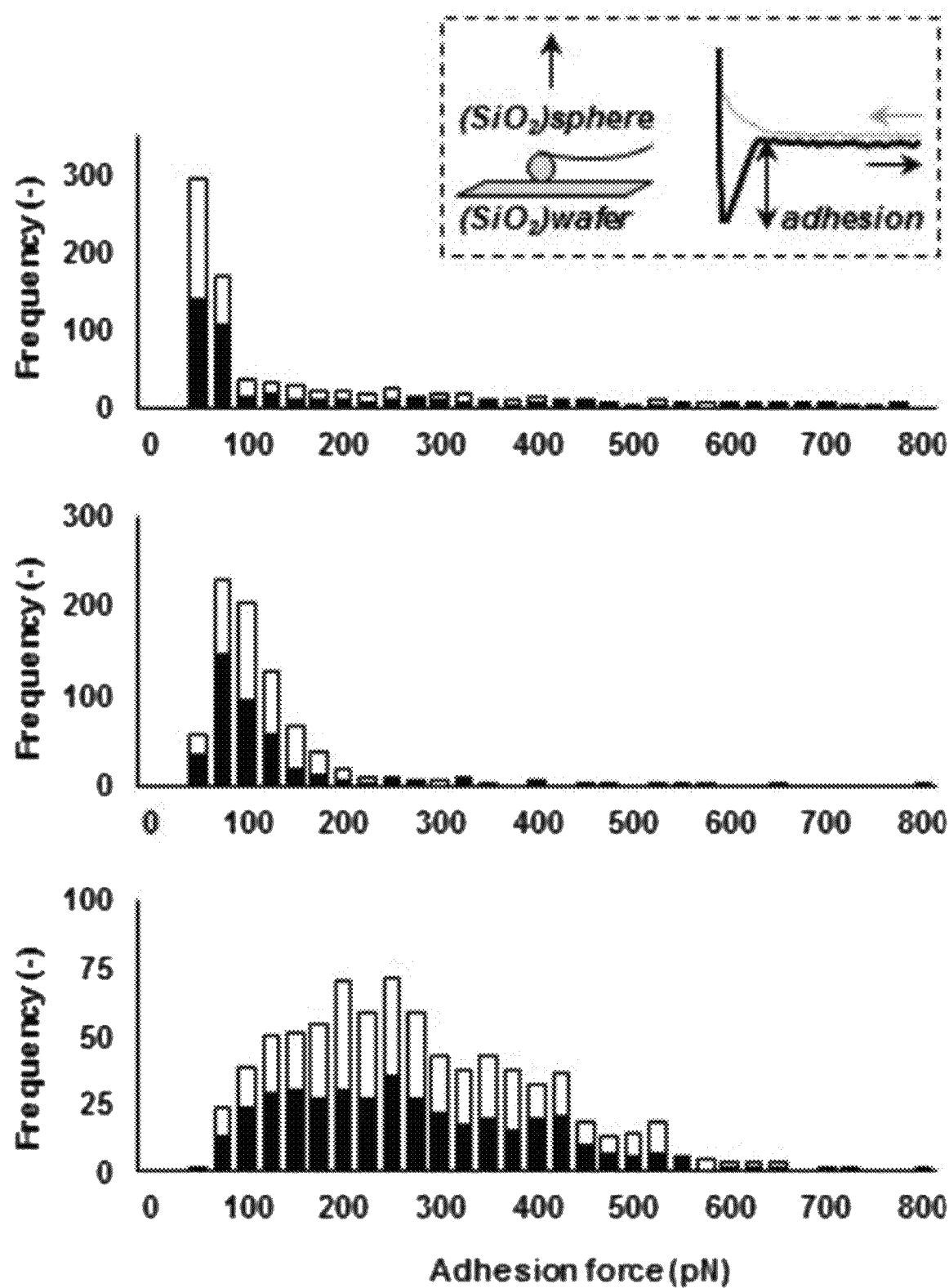
FIG. 10B shows histogram distributions of the adhesion forces of FIG. 10A for both data sets at 1 pN (black) and 2 pN (white) trigger force. Median values=54, 79, and 239 pN for 1, 10, and 100 mM KCl concentrations, respectively.
Figure 11:
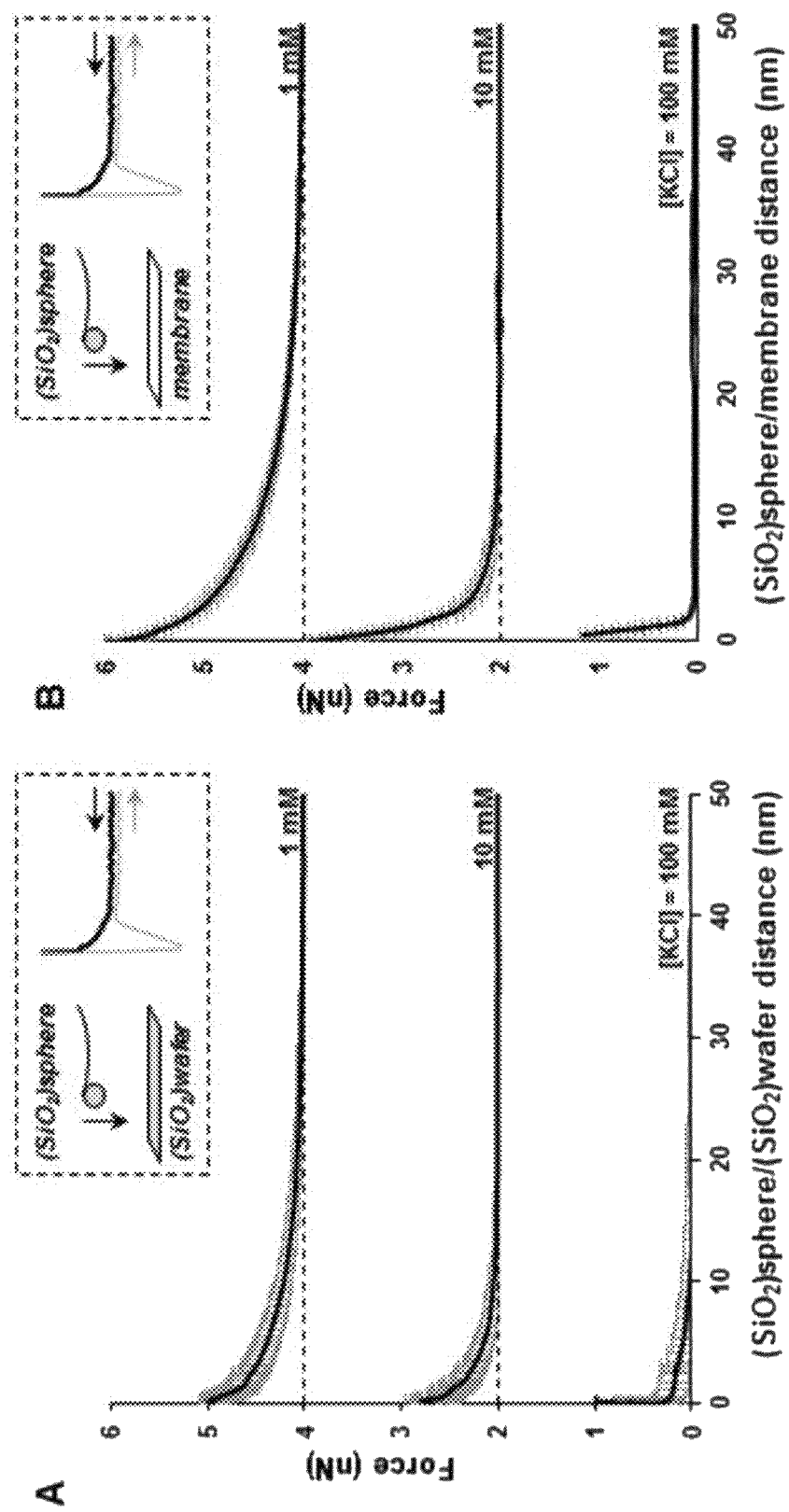
FIG. 11 is a chart showing repulsive (electrostatic) forces measured by AFM. Averaged (n=50) force-distance profiles measured by approaching a $SiO_2$ particle with a (FIG. 11A) $SiO_2$ wafer, and (FIG. 11B) hot-pressed FES membrane, as a function of KCl concentration (1-10-100 mM). Scan speed=1 μm/s; trigger force=1 nN.

In some embodiments, the surface energy between $SiO_2$ particles was obtained with AFM-FM between a 1 μm mean diameter $SiO_2$ sphere and a $SiO_2$ wafer as a function of trigger force and increasing KCl concentrations. As seen in FIGS. 10A-B, the trigger force had little effect on the force measurements. However, the adhesion forces (i.e. jump-out force on pull-out) increased with increasing salt concentration, as shown in FIG. 10B. The repulsive force as the surfaces approached between a $SiO_2$ sphere and a $SiO_2$ wafer as a function of increasing KCl concentrations is summarized in FIG. 11A. The amplitude and the extent of the repulsive forces increased with increasing KCl concentration. In calculating particle-particle interactions (and possible aggregation) during intrusion, these measurements are needed when point size particles are replaced by particles with specified diameters. Here, the point particles are given a charge but do not as yet account for particle-particle steric interactions.

Figure 10C:
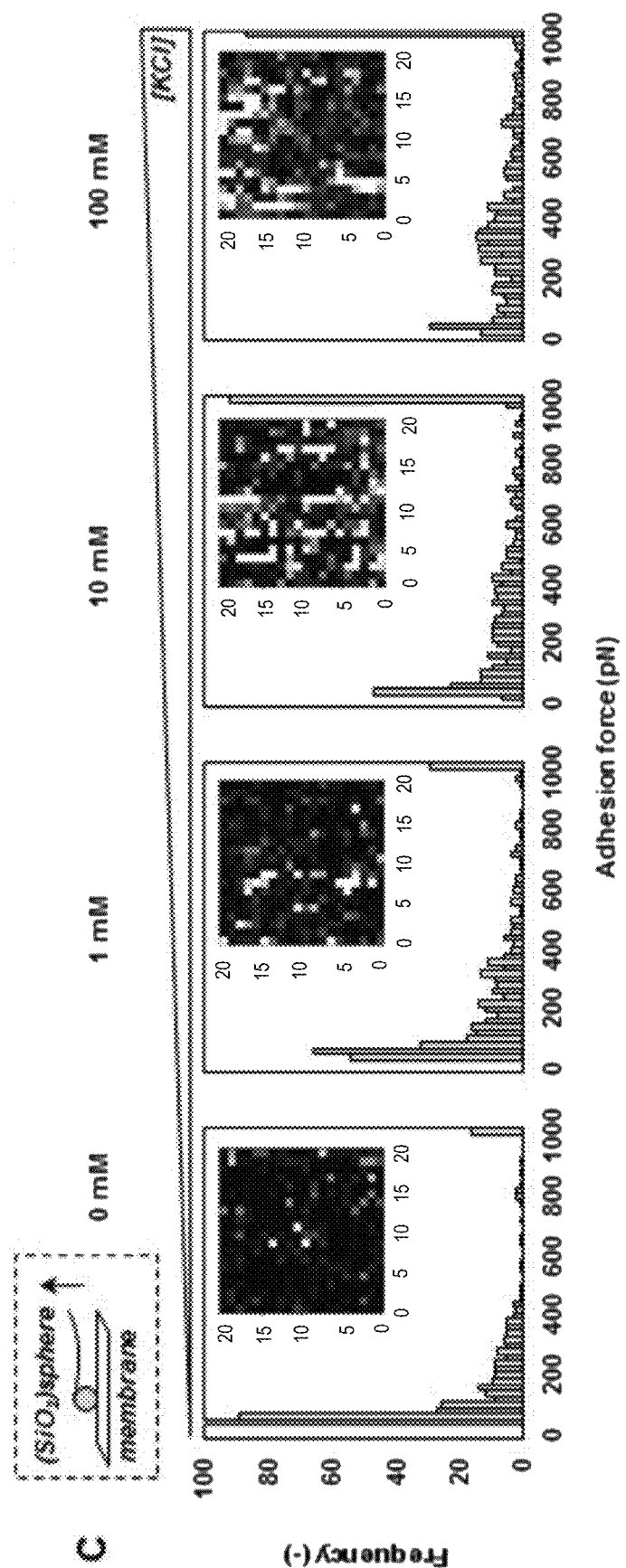
FIG. 10C shows force maps and histogram distributions (insets) between a $SiO_2$ particle and a hot-pressed PES membrane, as a function of KCl concentration (0-1-10-100 mM) (n=400). Median values=62, 138, 333, and 375 pN for 0, 1, 10, and 100 mM KCl concentrations, respectively.

In some embodiments, the surface energy between $SiO_2$ particle and a PES film was obtained with AFM-FM between a 1 μm mean diameter $SiO_2$ sphere and a PES sheet as a function of increasing KCl concentrations. As seen in FIG. 10C, the adhesion forces increased substantially with increasing salt concentration. The repulsive force as the surfaces approached between a $SiO_2$ sphere and a PES hot-compressed film as a function of increasing KCl concentrations is summarized in FIG. 11B. In some embodiments, a hot-compressed PES sheet was used to reduce data variability caused by the membrane roughness. Once again, the amplitude and the extent of the repulsive forces decreased with increasing KCl concentration.

In some embodiments, the median adhesion forces between the $SiO_2$ particle and a PES film at 100 mM KCl were 136 pN greater than that between the $SiO_2$ particle and a $SiO_2$ wafer, suggesting the adhesion to the PES surface was more intense than particle-particle interactions. Also, the repulsive forces and extent of forces into the fluid were higher and further, respectively, between the $SiO_2$ particle and a PES hot-compressed film as compared with that between the $SiO_2$ particle and a $SiO_2$ wafer, again suggesting the repulsion from the PES surface was more intense than between particles. Thus, once particles adhered to the PES (internal) surface, overcoming their adhesive force to dislodge these particles requires more energy than detaching two $SiO_2$ particles from each other.

Figure 12:
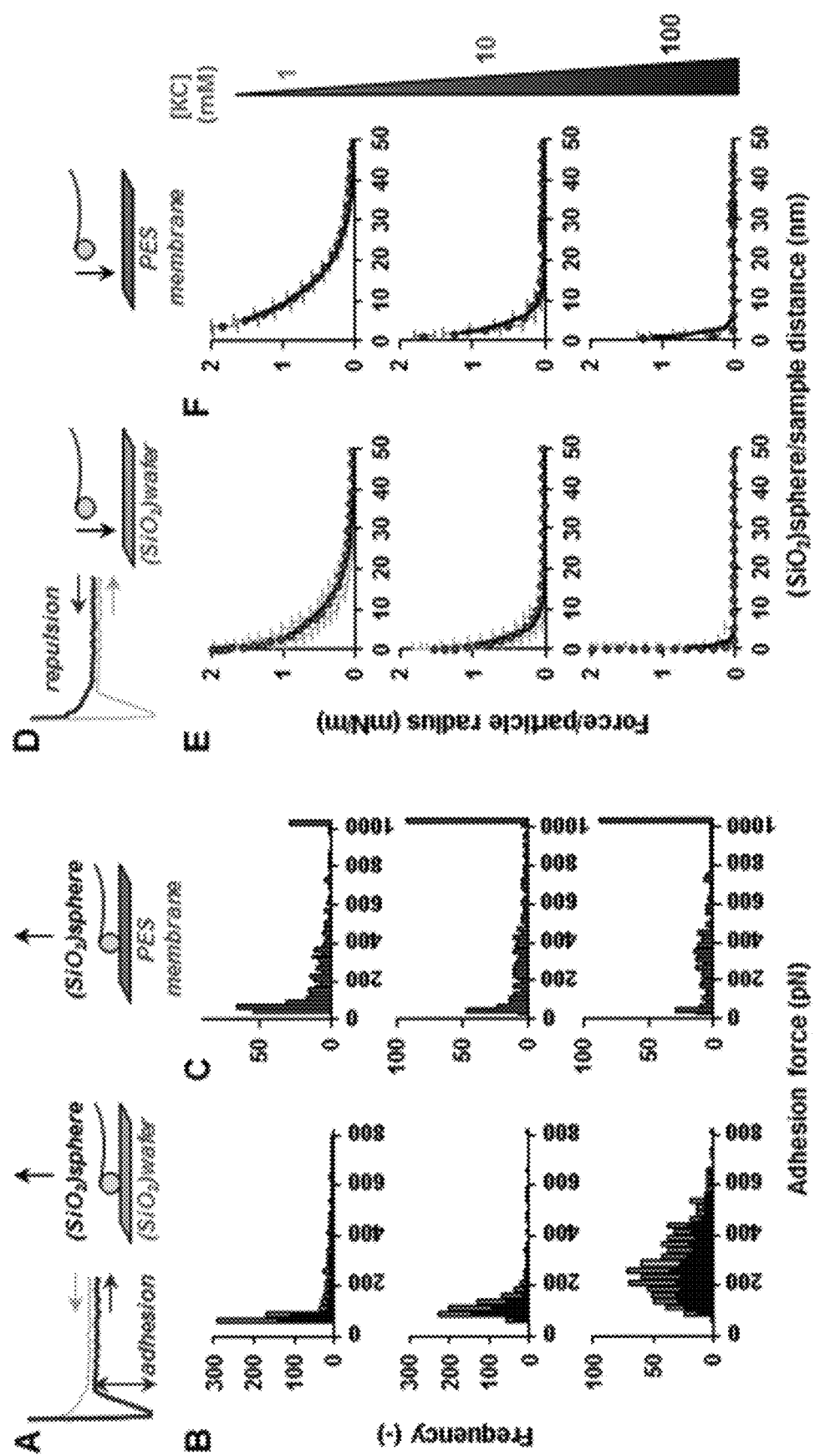
FIG. 12 is a chart showing surface interactions measured by AFM. Schematic of (FIG. 12A) the adhesion and (FIG.

In some embodiments, the surface forces and energies between particle/particle and particle/PES film were measured in aqueous solutions using AFM-FM, with a 1 μm diameter $SiO_2$ particle attached to a cantilever and a $SiO_2$ wafer (substitute for $SiO_2$ particle) or a hot-compressed PES membrane (to obviate pores and roughness), respectively, as shown in FIG. 12.

In some embodiments, the adhesion forces, i.e. jump-out force on pull-out, increased with increasing KCl concentration for both $SiO_2$ particle/$SiO_2$ wafer and $SiO_2$ particle/PES membrane, while it was independent of trigger force, as shown in FIGS. 12A-C. The median adhesion forces between $SiO_2$ particle/PES membrane at 100 mM KCl were ~136 pN greater than that between $SiO_2$ particle/$SiO_2$ wafer. Thus, once particles adhered to the PES (internal) surface, overcoming their adhesive force to dislodge these particles requires more energy than detaching two $SiO_2$ particles from each other.

In some embodiments, the amplitude and extent of the repulsive force (i.e. positive curvature during the cantilever approach to the sample) decreased with increasing KCl concentration, indicative of electrostatic interactions, for both $SiO_2$ particle/$SiO_2$ wafer and $SiO_2$ particle/PES membrane, as shown in FIGS. 12D-F. Hence, the DLVO theory for a sphere near a flat surface fitted well to the force/$SiO_2$ particle radius-distance curves. In particular, for the $SiO_2$ particle/$SiO_2$ wafer embodiment shown in FIG. 12E, the results showed that the force/particle radius-distance curves were well described by considering only the electrostatic repulsion between the two negative $SiO_2$ surfaces and neglecting the van der Waals contribution. This shows the lack of adhesion at small separation between silica surfaces in aqueous electrolyte solutions: the hydroxylation of silica surfaces exposed to water for an extended time results in the formation of silicic acid group, carrying a negative charge.

While $SiO_2$ particle/particle interaction was neglected in some embodiments, the estimated surface potential was used to calculate the number of elementary charges on the $SiO_2$ particle surface: ~132,000, 100,000, and 62,000 for 100, 10, and 1 mM, respectively. The 1 μm diameter $SiO_2$ particles used in some embodiments are large (on a molecular scale) and their surface charge sets up an electric field about the particle that is similar to the field established by the membrane surface. In some embodiments, the electrical force driving the particles toward or away from the membrane surface is proportional to the field strength in the liquid medium and the charge on the particle. Given that the Debye lengths are so small, significant electrostatic forces only exist within a region that is extremely close to the membrane surface (i.e. a few 10s of nanometers). Once a particle gets in close proximity to the membrane, intermolecular forces begin to dominate over hydrodynamic forces, allowing the particles to stick to the surface. For the $SiO_2$ particle/PES membrane embodiment shown in FIG. 12F, at KCl=1 mM the fitting parameters of the DLVO theory were: surface potential, $\varphi_0=-59.9$ mV and Hamaker constant, $A=3.1\times10^{-21}$ J.

The surface potential obtained by the DLVO theory was in good agreement with independent zeta potential measurements using an electro-chemical test cell. Two methods, streaming potential and streaming current, gave comparable zeta potential values of $-64.5\pm5$ and $-65.5\pm4.3$ mV, respectively, at KCl=1 mM. Thus, in preferred embodiments, for the computation of SiO2 particle/PES surface interactions, $-65$ mV and $-80$ mV are selected as estimates of the membrane surface potential of the internal pore surface.

Modeling transport processes involved in membrane filtration is a complex problem occurring over many length and time scales. In some embodiments, the aim is to simulate particle transport and hold-up in a microporous PES membrane from the pore-level (0.2 and 5 μm mean pore size) to the full membrane thickness (130 μm). Throughout, the length scales of ionic solutions are well within the continuum domain and are modeled as continuous fluids. Water with an equimolar concentration of cations and anions is used to simulate a DI water-KCl salt solution.

$SiO_2$ particles on the order of 0.25 and 1 μm approach 5-20% of the mean pore diameter, which challenges the continuous fluid approximation. However, in these embodiments, particles were points without size, and this approximation was met. Newtonian forces act on the imaginary particles causing their acceleration. Stokes's drag arising from the fluid-particle interaction is the primary particle driving force. Lift forces, including wall-induced lift, act to perturb particles from fluid streamlines. Close to the pore walls, forces arising from the surface electrostatic potential are simulated according to the Debye length for dilute electrolyte solutions. The discreet particles carrying a charge Coulomb and van der Waals forces are simulated to account for inter-particle forces.

In some embodiments, the methodology for simulating this type of filtration process is by coupling together several numerical solutions in a piecemeal fashion. A static solution to Stokes's flow through a conformally mapped membrane geometry is the core of the simulation and given by:

$$0=\nabla\cdot\{-\rho \vec{I} + \mu[\nabla \vec{V} + (\nabla \vec{V})^T]\} + \vec{F} \quad (1)$$

$$0=\rho\nabla\cdot(\vec{V}) \quad (2)$$

In some embodiments, the flow domain geometry is directly modeled from 2D SEM images, as shown in FIG. 7. The solution for the velocity distribution and applied pressure for the laminar flow sub-model for the 0.2 µm mean pore diameter PES membrane is shown in FIG. 3. Couple to this solution are several sub-models. In some embodiments, a chemical species transport simulation model is used to simulate a weak 1:1 electrolyte solution. The ionic species from this simulation are coupled to an electrostatics simulation model to determine the penetration depth of the PES surface charge into the liquid domain. The resulting sub-model allowed for the Debye length from the pore walls to be a function of ionic concentration as follows:

$$\frac{1}{\lambda} = \sqrt{\frac{2e^2 p_\infty^c}{\epsilon \epsilon_o kT}} = \sqrt{\frac{4e^2 C_0}{\epsilon \epsilon_o kT}} \quad (3)$$

The parametric simulation shown in FIG. 5 was verified against the benchmark value of 0.31 nm at a molarity of 1. Solution voltage results on applying the simulation strategy to the 0.2 µm mean pore diameter PES membrane geometry are shown in FIG. 8.

Figure 13A:
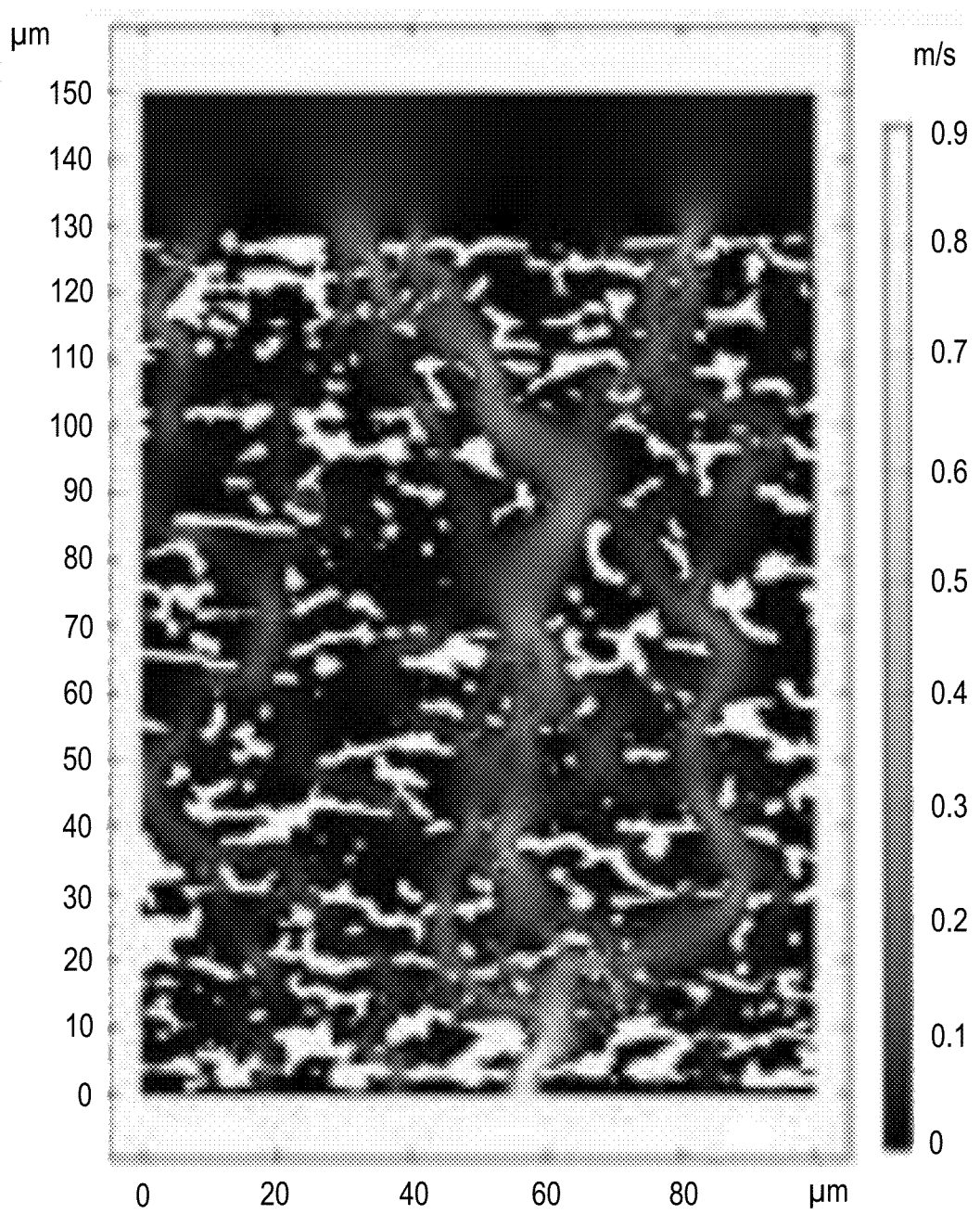
FIG. 13A shows a 2D laminar flow field.
Figure 13B:
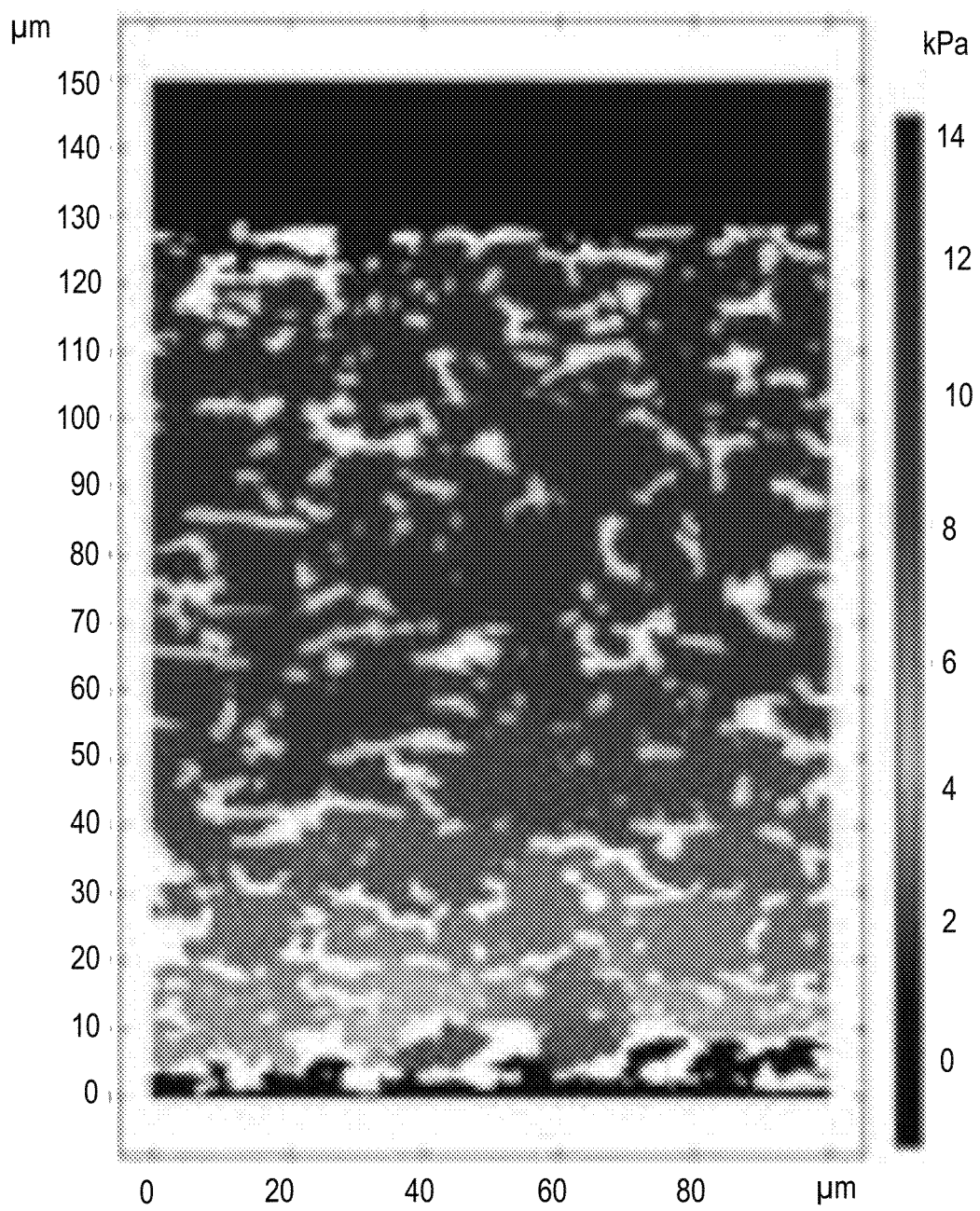
FIG. 13B shows a pressure field, where pressure drops from a maximum of 14 kPa (~2 psi) at the top face to nearly zero at the bottom face.

In some embodiments, fluid and particles drag through a commercial microporous membrane was analyzed. In some embodiments, the flow field as a function of pressure was determined. From a SEM image of the 5 µm mean pore size porous membrane, an area with a thickness of 130 µm from inlet to outlet (y-axis) and a width segment of 100 µm (x-axis) was selected. FIG. 13A represents a 2D laminar flow field with flow from top to bottom through a 2D porous structure of a 5 µm mean pore diameter PES membrane obtained from SEM showing uneven flow through a few major conduits. The pressure-drop from a maximum at the top face of the 5 µm mean pore diameter PES membrane of 14 kPa (~2 psi) is presented in FIG. 13B, where 50% drop occurred in the bottom 30% of the flow path. This nonlinear pressure drop is likely due to the presence of the perforated skin at the bottom face. The maximum Reynolds number ("Re") for the flow was approximately:

$$Re_{d,max} = \frac{vD}{v} = \frac{0.9\frac{m}{s} \cdot 5 \ \mu m}{9 \times 10^{-7}\frac{m^2}{s}} = 5 \quad (4)$$

Figure 13C:
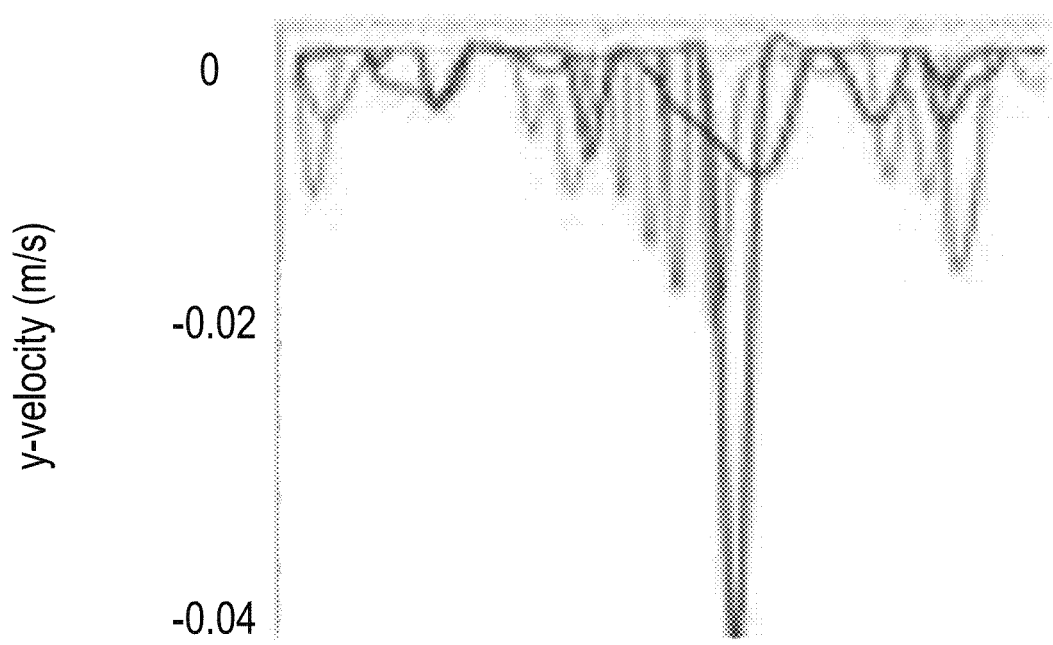
FIG. 13C shows average velocity (m/s) profiles across the 100 µm width at depths of 0, 40, 80, and 120 µm from the top face.

Thus, the Re number varied from 0-5 within the membrane. A similar analysis at very low pressure drop of 50 Pa gave the similar images to those in FIGS. 13A-B with flow velocities of the order of ~3 mm/s. In FIG. 13C, the axial velocities horizontally across the image at 0, 40, 80, and 120 µm along the flow path from top to bottom are shown. Only three major flow conduits are observed suggesting very poor flow distribution. These 2D highways of flow suggest that optimization of the internal morphology for flow is needed.

Figure 14:
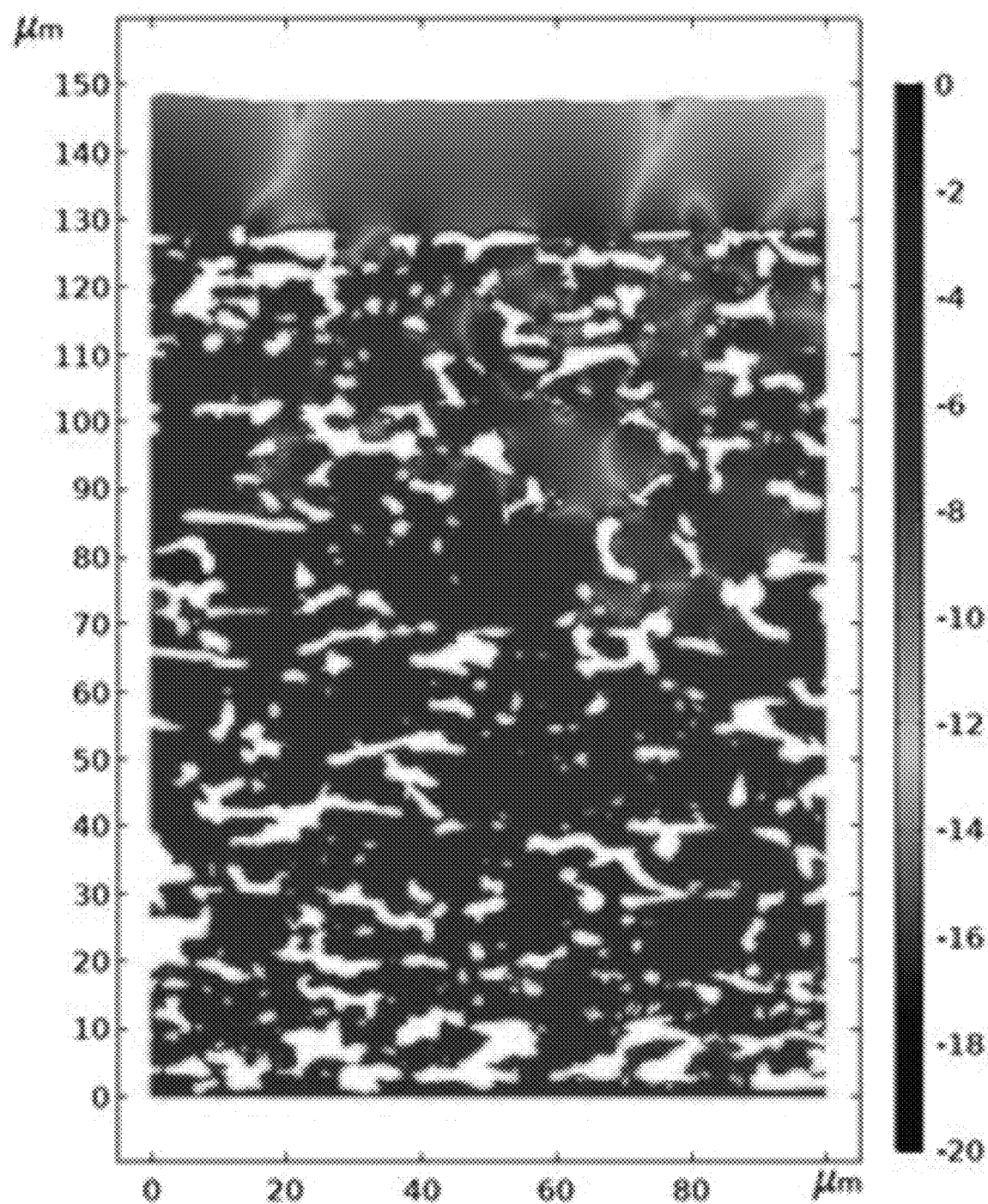
FIG. 14 is a chart showing local electric field in solution in the porous PES membrane of FIG. 13.

The relative voltage potential (log ($\varphi/\varphi_0$), where ($\varphi_0$=−65 mV is the surface potential obtained from zeta potential measurements) in solution in the same membrane cross-section as that shown in FIG. 13, is presented in FIG. 14. The electrical potential in some solution regions near the top 30% of membrane thickness approaches very low values (~0 mV), while in others near the bottom face, it is close to $\varphi_0$, i.e. log ($\varphi/\varphi_0$~1.0)→0. For the former regions, the electrical potential in solution can be neglected, while for the latter regions it should be included when the particles are very close to the pore wall (<100 nm). Farther away (>100 nm), the potential field will not perturb particles.

Figure 15A:
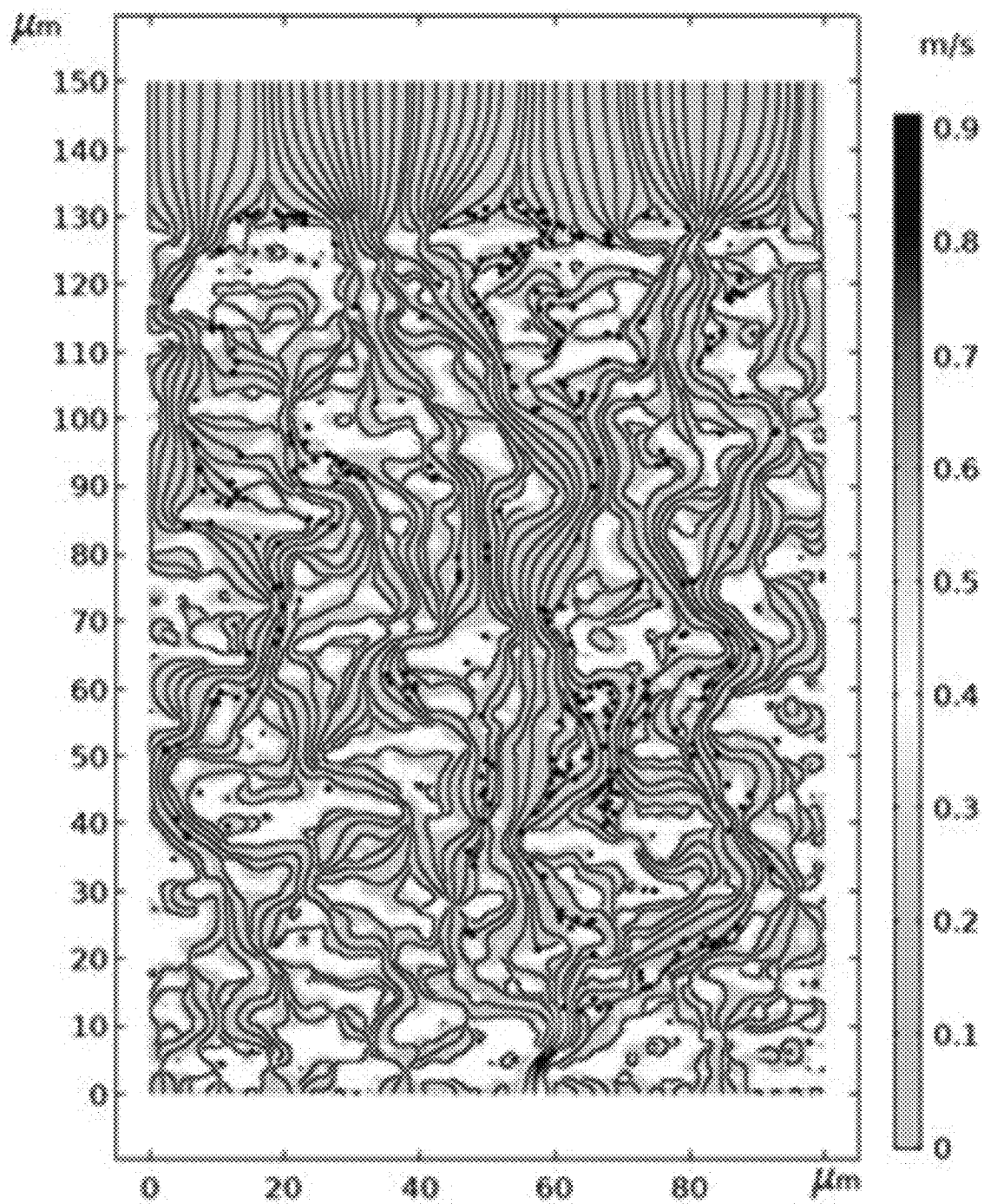
FIG. 15 is a chart showing the effect of van der Waals interactions on the membrane of FIG. 13. 300 equally spaced 1 µm diameter charged particles with a membrane wall potential of $\varphi_0$=−65 mV are released in a 1 mM electrolyte solution, at the top surface where the driving pressure is set to 14 kPa (~2 psi). Fluid mechanical forces include Stokes drag and Saffman lift, while particle-surface forces include electrostatic repulsion (with DLVO double layer) (FIG. 15A) without van der Waal's attraction or (FIG. 15B) with van der Waal's attraction to the surface.
Figure 15B:
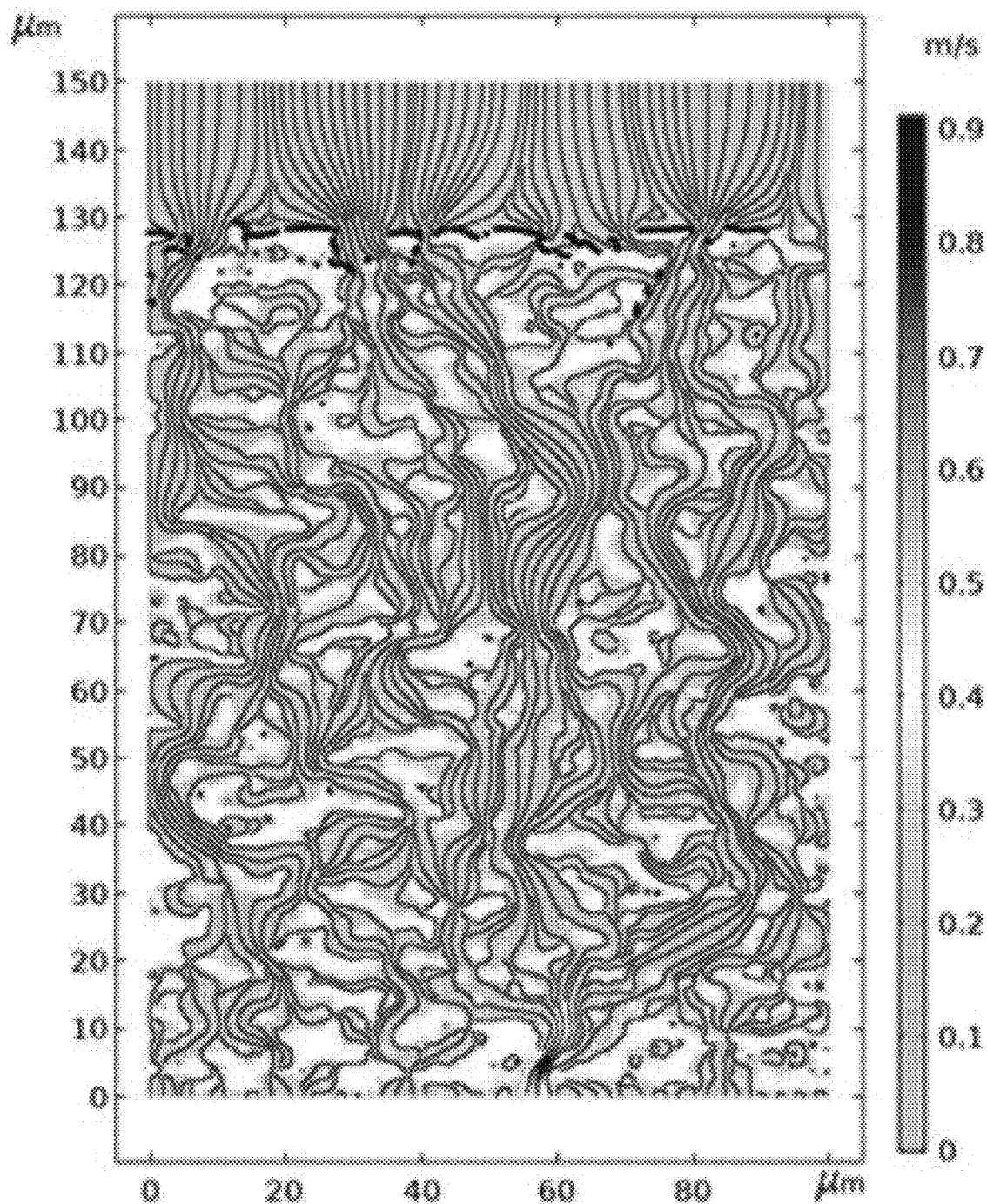

In some embodiments, charged particle drag in the absence and presence of van der Waals attraction to the surface was determined. 300 randomly spaced (over an area of 125×5 µm$^2$) 1 µm diameter particles with a point potential of $\varphi_0$=−100 mV at an electrolyte concentration of 1 mM were released at the top surface of the same membrane cross-section as used in FIGS. 13-14 under a transmembrane pressure of 14 kPa (~2 psi) in the absence and presence of van der Waals attraction to the surface, as shown in FIGS. 15A-B. Their horizontal positions were randomly selected, and they were given initial velocities and trajectories dictated by the local flow field. The particles were then subjected to drag, electrical, and van der Waals forces. As shown in FIG. 15B, in the presence of van der Waals attraction, far less particles intruded into the microporous membrane, but they were rather trapped at the entrance to the membrane at the top surface.

Figure 16:
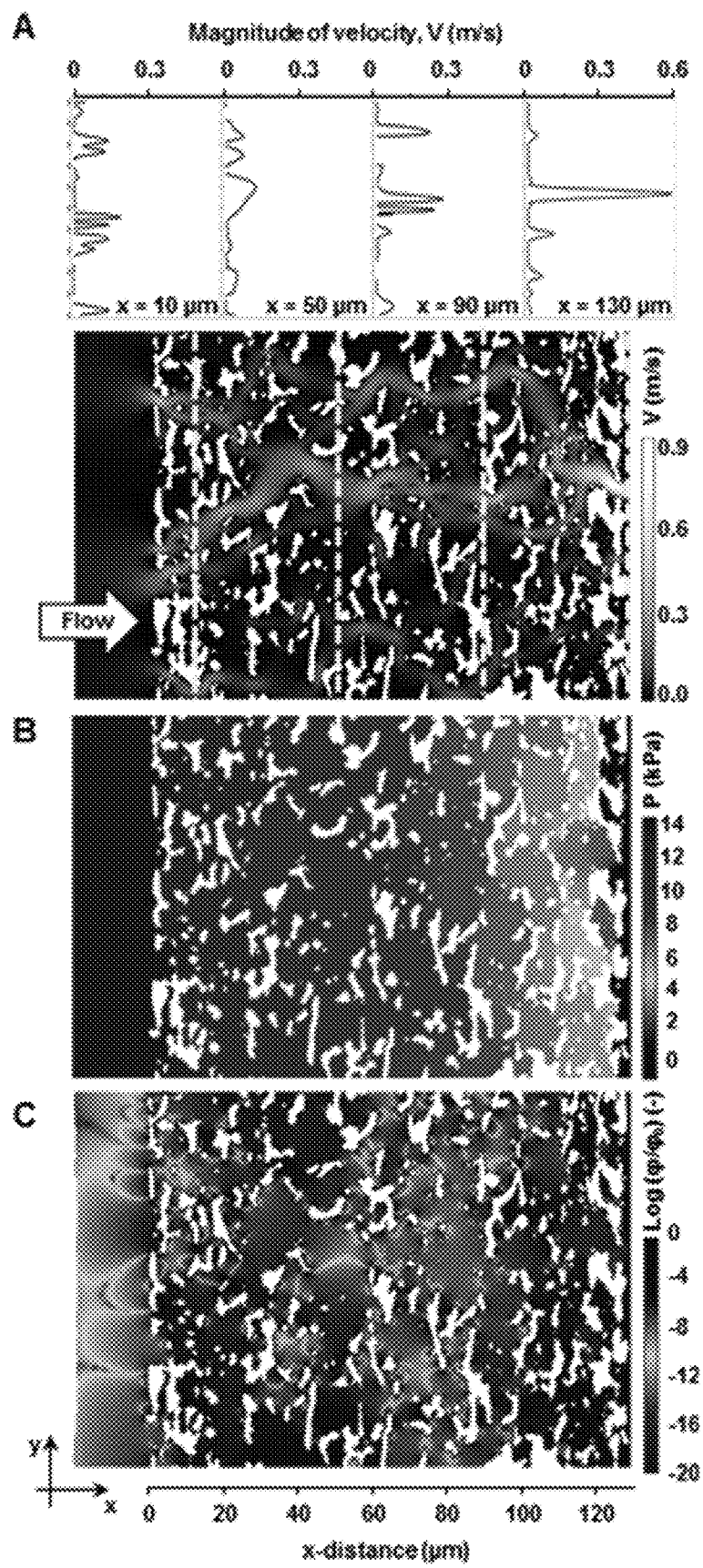
FIG. 16 is a chart showing the flow, pressure, and electric fields inside a commercial 5 µm mean pore size porous PES membrane. The observed membrane segment has a thickness of 130 µm from inlet (x-axis, left) to outlet (x-axis, right) and a width segment of 100 µm (y-axis).

In some embodiments, from a SEM image of the 5 µm mean-pore-size porous membrane, an area with a thickness of 130 µm from inlet to outlet (x-axis) and a width segment of 100 µm (y-axis). FIG. 16A shows the 2D laminar flow field through the porous structure. The left-hand side of the figure represents the top face of the membrane with inlet flow. The figure highlights the uneven flow distribution dominated by a few major conduits that condense into one dominant fast velocity near the back face. The maximum pore Reynolds number ($Re_{pore}$) for the flow was approximately:

$$Re_{pore,max} = \frac{v_{max}D_{pore}}{v} = \frac{0.9\frac{m}{s} \cdot 5 \ \mu m}{9 \times 10^{-7}\frac{m^2}{s}} = 5 \quad (5)$$

In some embodiments, the average $Re_{pore}$ was ~20 fold smaller, based on the average velocity of 0.04 m/s. Only three major flow conduits are observed. These represent the paths of least resistance through the membrane and correspond to regions having the least amount of PES membrane material. These 2D flow highways suggest that further optimization of the internal morphology for flow is required to enhance the capacity of the membrane.

The pressure profile through the membrane is presented in FIG. 16B. The drop is overall linear except for the regions within about 10 µm of the entrance and exit of the membrane. In those regions, flow restrictions due to surface skin layers increase the local pressure drop. This behavior correlates well with the number in inlet and outlet flow channels observed in FIG. 16A.

The relative voltage potential (log $\varphi/\varphi_0$), where $\varphi_0$=−65 mV is the surface potential obtained from zeta potential measurements) in solution is presented in FIG. 16C. The electrical potential drops off exponentially moving away from the membrane wall. In most regions, the electrical potential in solution can be neglected (~0 mV) everywhere except within ~100 nm of the statically charged wall.

Figure 17:
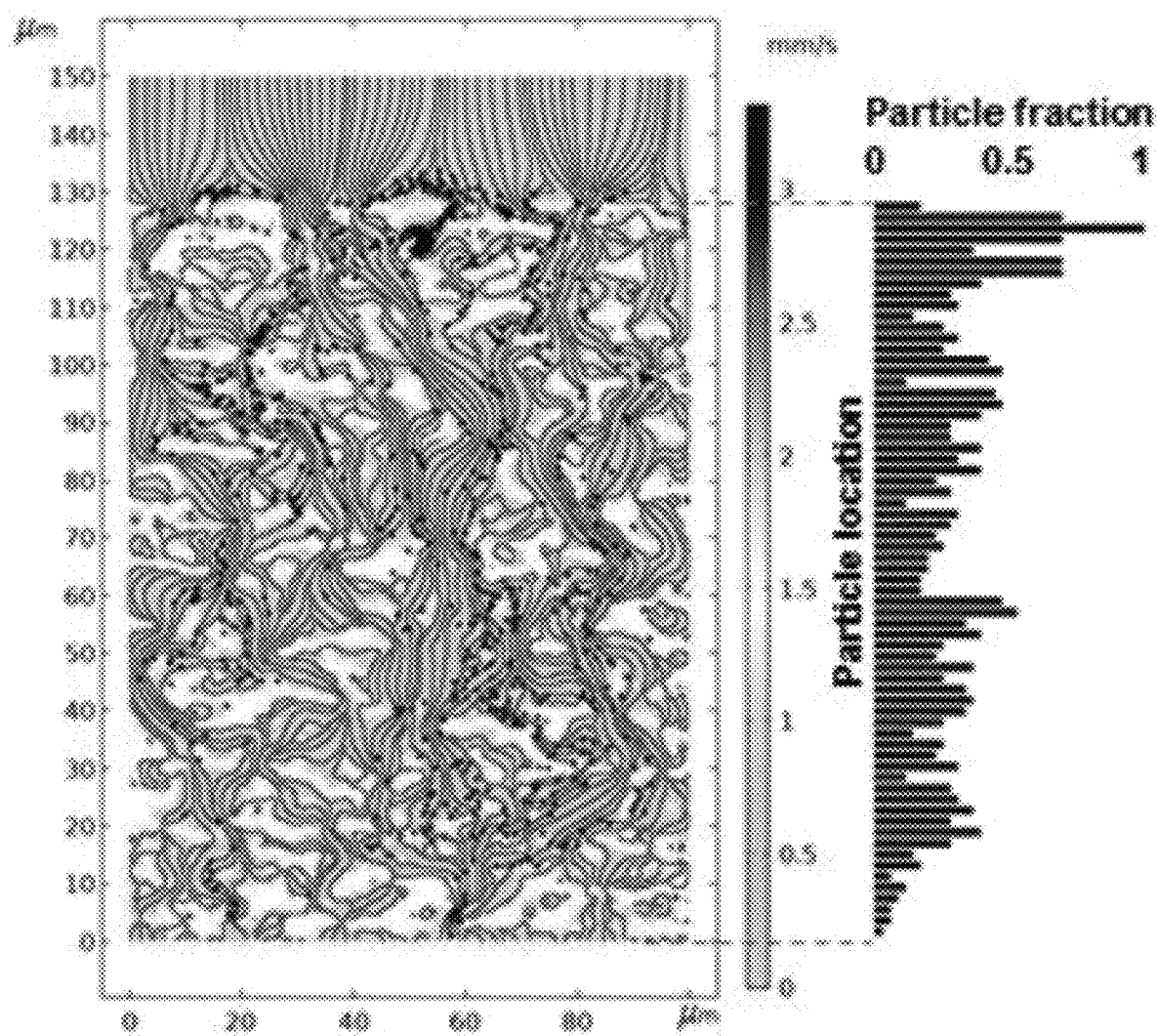
FIG. 17 is a chart showing transient single particle tracking in the membrane of FIG. 13. 300 equally spaced 1 µm diameter particles with a membrane wall potential of $\varphi_0$=−80 mV were released in a 1 mM electrolyte solution at the top surface where the driving pressure is set to 50 Pa. Fluid velocity is given by the color key on the right. Integrated particle numbers (right histogram) at each horizontal position as a function of depth along the membrane from inlet (top) to exit (bottom). 2 µm bins were used.
Figure 18:
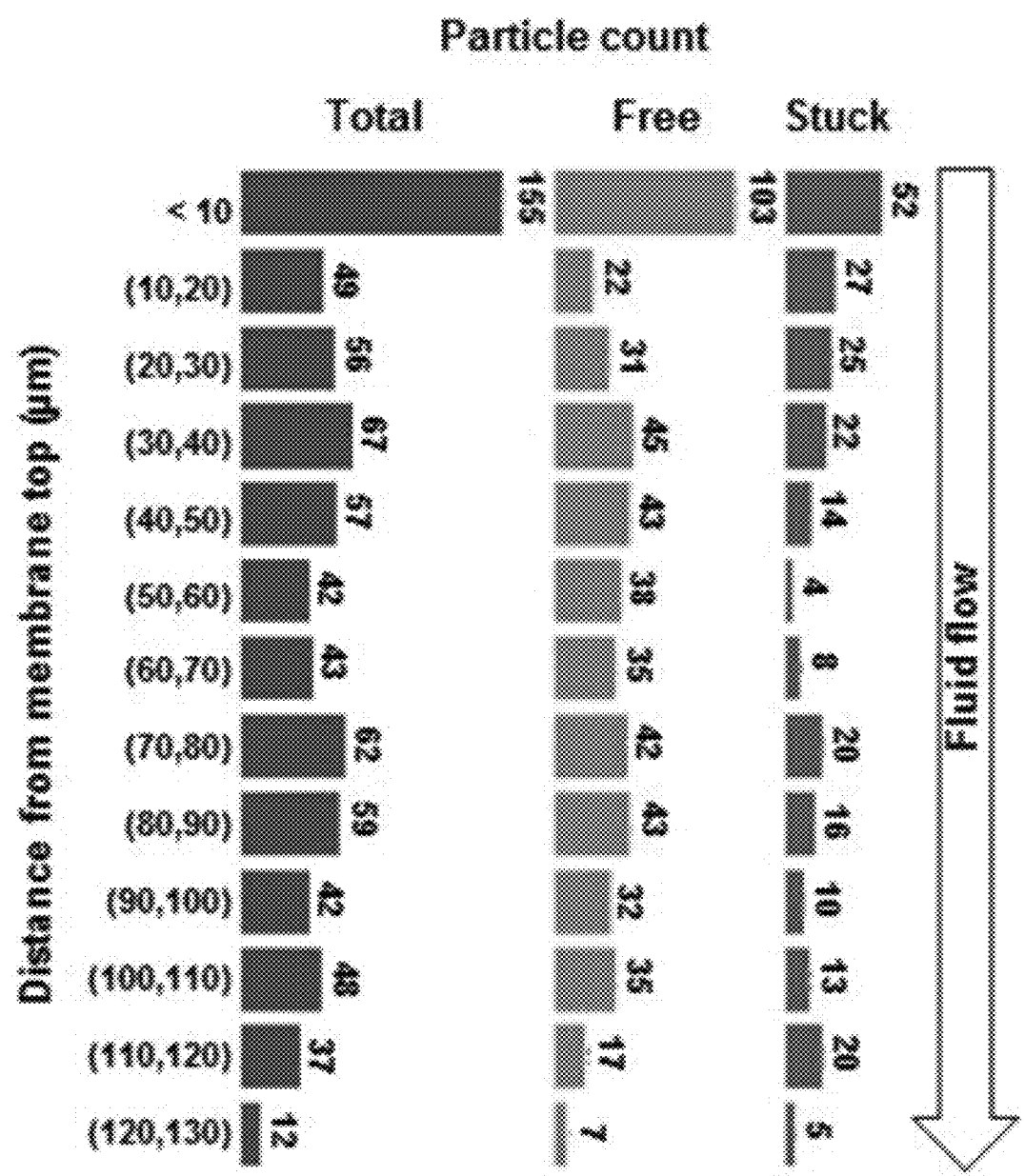
FIG. 18 is a chart showing the number of total, free, and adhered (stuck) particles with path length along the flow direction for the particles tracked in FIG. 17. Integrated particle numbers as a function of depth along the membrane from inlet to exit. 10 µm bins were used. For the first bin at the top, 66.5% and 33.5% of 155 particles were free and stuck, respectively.

In some embodiments, transient single particle tracking was performed. 300 randomly spaced 1 µm diameter particles with a wall potential of $\varphi_0$=−80 mV at an electrolyte concentration of 1 mM were released along the top surface every ⅓ s for a total of 1 s (i.e. total of 900 particles released). The same membrane cross-section as that used in FIGS. 13-15 was selected for particle tracking, as shown in FIG. 17. Since the particles hardly entered the pores in FIG. 15, the applied pressure was reduced substantially to 50 Pa and the membrane wall potential was decreased to $\varphi_0$=−80 mV to reduce wall adhesion. Once again, just as seen for the 14 kPa transmembrane pressure in FIGS. 13-15, several dominant high velocity flow conduits appear. Many particles enter the membrane pores and are dragged along in these high velocity flow conduits. Integrated particle numbers as a function of depth along the membrane flow path from inlet to exit is shown in FIG. 17 (2 µm bins were used). Some particles were held-up in slow- or no-flow dead-ended pores. Here the hydrodynamic forces are often insufficient to dislodge particles held on the walls or that collect in the small pores. The number of total, free, and adhered (stuck) particles with path length along the flow direction is summarized in FIG. 18 (10 µm bins were used). For the first 10 µm at the top of the membrane, of 155 particles within this membrane porous region, 66.5% and 33.5% were free and stuck, respectively. Of the total 900 (100%) particles entering the membrane, 493 (55%), 236 (26%), and 171 (19%) were free, stuck, and disappeared from view, respectively. These results suggest that particle capture was mostly near the top of the membrane.

In some embodiments, transient dual particle tracking was performed. 150 1 µm diameter and 150 2 µm diameter were introduced together and simultaneously in the area directly above the top membrane surface. A membrane wall potential of $\varphi_0=-65$ mV and a transmembrane pressure of 14 kPa (~2 psi) with van der Waals attraction to the surface was selected. Also, all particles had the same repulsive negative charge, in qualitative agreement with AFM force measurements in FIG. 10B. Their horizontal positions were randomly selected, and they were given initial velocities and trajectories dictated by the local flow field. The particles were then subjected to drag, electrical, and van der Waals forces. When the particles approached the membrane to the point where electrostatic and van der Waals forces overcame the hydrodynamic forces, they stuck to the surface.

Figure 19:
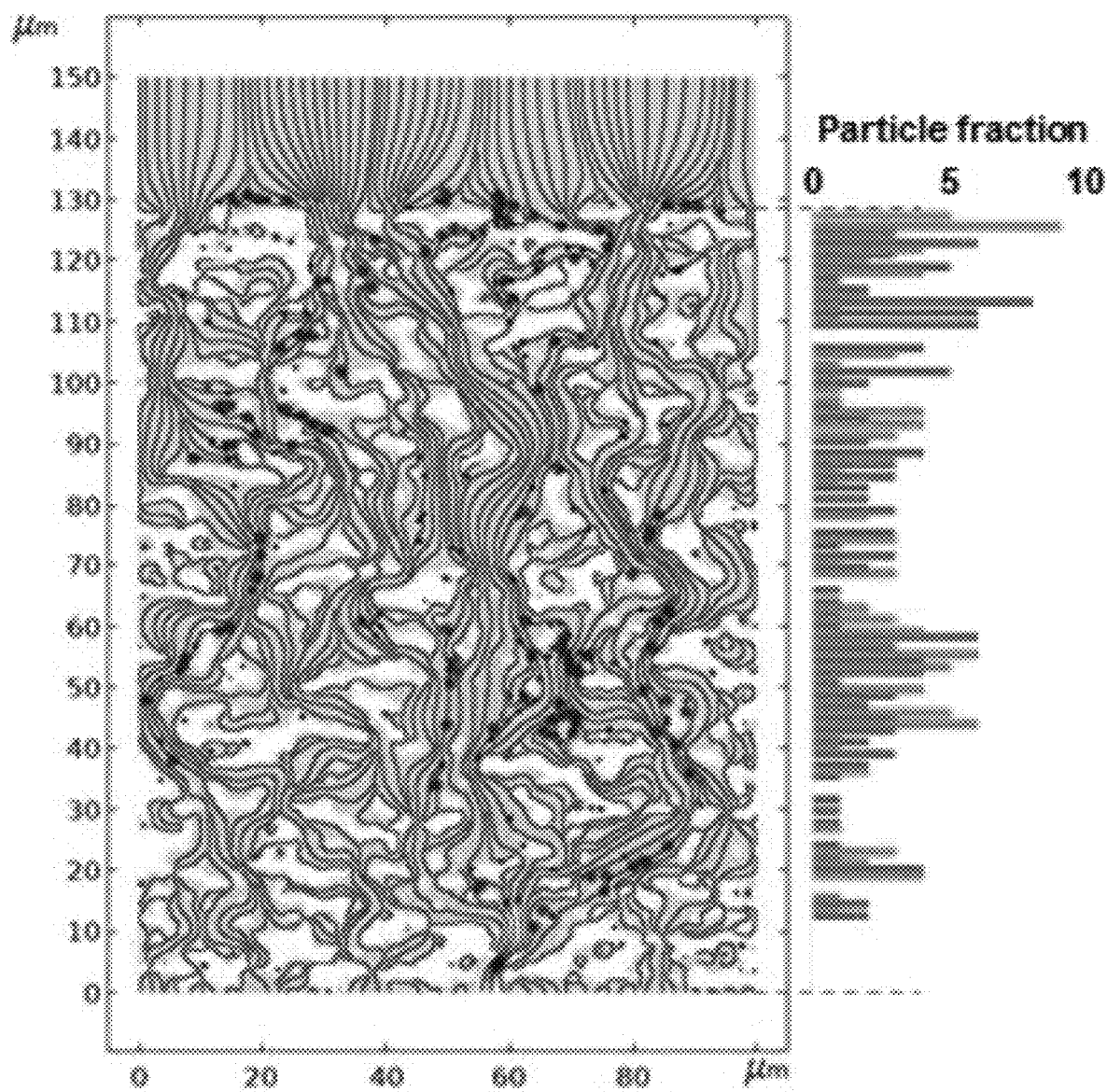
FIG. 19 is a chart showing transient dual particle tracking in the membrane of FIG. 13. 150 1 µm diameter (blue) and 150 2 µm diameter (red) particles were introduced together and simultaneously in a 1 mM electrolyte solution in the area directly above the top membrane surface. The membrane wall potential was $\varphi_0$=−65 mV and the driving pressure at the top face was 14 kPa (~2 psi). Of the 300 released particles: 235 particles were free (124 1 µm diameter particles and 111 2 µm diameter particles), 23 particles were adhered (or stuck) to the internal surface (12 1 µm diameter particles and 11 2 µm diameter particles), and 42 particles disappeared/permeated completely (14 1 µm diameter particles and 28 2 µm diameter particles) after the run. Integrated particle fractions (of the total at that cross-section) as a function of depth along the membrane from inlet to exit. 2 µm bins were used.

The model kept track of each particle and whether that particle adsorbed and stuck to the wall surface, freely moved through the pore space, or exited the membrane, as shown in FIG. 19. Again, only a few major flow conduits appear. Several interesting points include within the 100×130 µm² (width×length) membrane segment viewed: (i) only three major fast flowing fluid channels were present containing fewer particles, (ii) many particles were held-up near the top face of the membrane in the low flowing regions, and (iii) many pores of the membrane had low or no flow and were devoid of particles. These results suggest that there are opportunities to design better membrane structures.

In FIG. 19 (2 µm bins were used), the integrated particle numbers of both the large (2 µm diameter) and small (1 µm diameter) particles as a function of depth along the membrane from inlet to exit are displayed. This embodiment allows one to estimate the selectivity between sufficiently distinguishable species (particle here) and solute flux as a function of flow path location. Since the mean pore size of the membranes used here was 5 µm, the particles were either too small (1 and 2 µm) to exhibit differential selectivity, or the sensitivity of the method under these circumstances was inadequate.

Figure 20A:
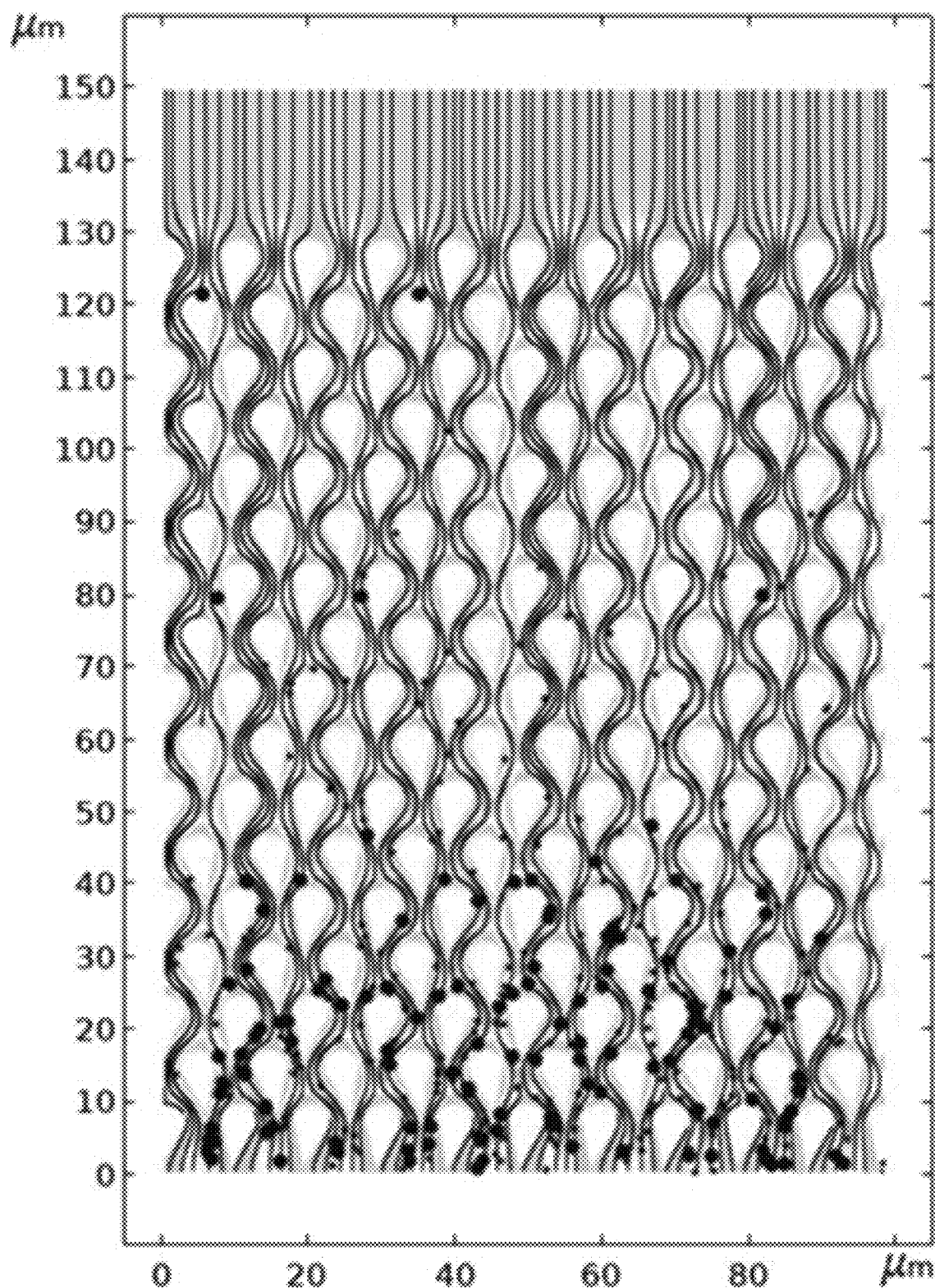
FIG. 20A shows 10°.
Figure 20B:
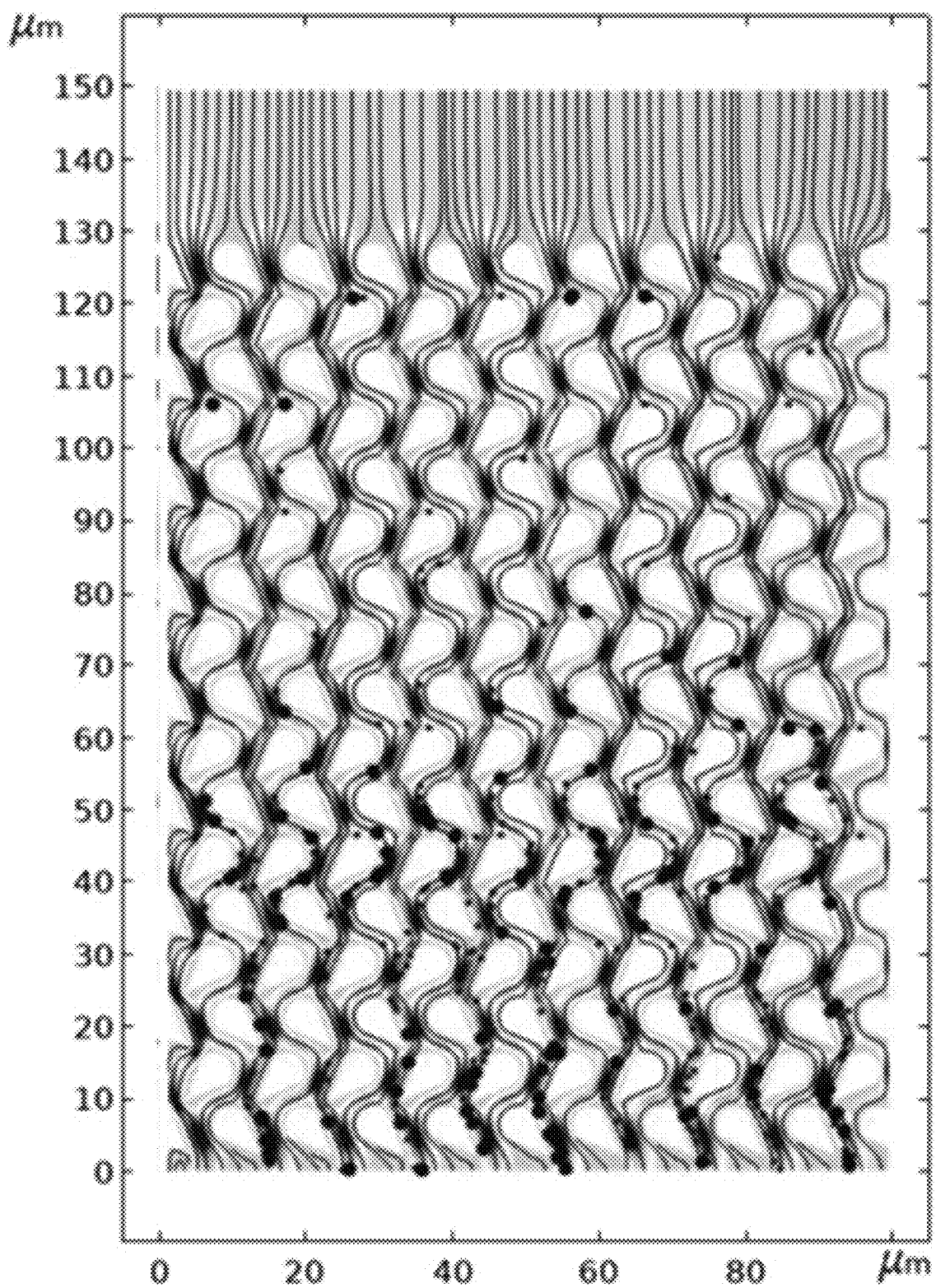
FIG. 20B shows 70°.
Figure 20C:
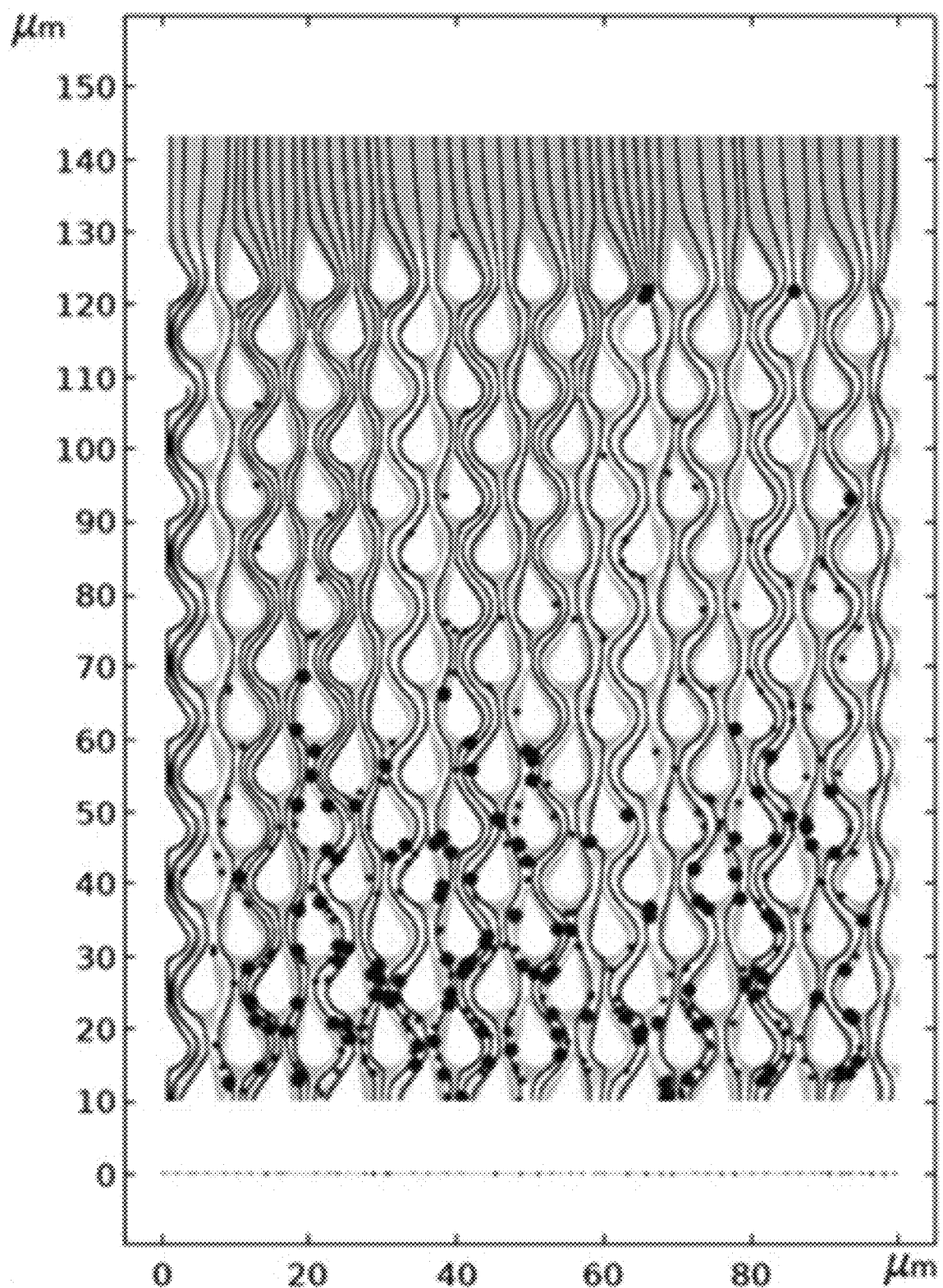
FIG. 20C shows reversed 10° (=170°) teardrops rotated from the vertical.

In some embodiments, fluid and particle drag through a hypothetical microporous membrane was analyzed. In some embodiments, transient dual particle tracking in a teardrop membrane was performed. The choice of hypothetical structures is important and will depend on the desirable goals of capturing or passing suspended particles in or through a membrane and evenness of flow across the horizontal exit axis. In some embodiments, teardrops were selected because they exhibit relatively low pressure drop and sufficient surface area for binding. FIG. 20A-C shows a binary system of particles in a membrane with three orientations of teardrops: ±10°, ±70°, and reversed 10° (=±170°) teardrops relative to the axial direction of flow, respectively. The membrane is a computer generated, staggered array of teardrop obstructions. In some embodiments, individual rows of teardrops were rotated ±170° from the vertical. 300 1 µm diameter and 150 2 µm diameter particles were introduced together and simultaneously in a 1 mM electrolyte solution in the area directly above the top membrane surface. The membrane wall potential $\varphi_0=-65$ mV, the particle charge was Z=−100, and particle-particle interactions included van der Waals (Hamaker constant, $A=6\times10^{-21}$ J). The driving pressure at the top face was 14 kPa (~2 psi) and the maximum velocity was 0.2 m/s.

In some embodiments, binary particle tracking was performed. Results of particle tracking for a binary system flowing through the commercial membrane and a computer-generated teardrop membrane are shown in FIGS. 21A and 21B, respectively. In some embodiments, teardrops were selected because they exhibit relatively low pressure drop, have sufficient surface area for binding, have more uniform velocity distribution, permit an overall average velocity nearly twice that of the commercial membrane, and particle tortuosity and hence movement was controlled through teardrop orientation and wall charge. In some embodiments, 300 1 µm diameter and 150 2 µm diameter particles were simultaneously introduced in the region directly above the top membrane surface. A membrane wall potential of $\varphi_0=-65$ mV and a transmembrane pressure of 14 kPa (~2 psi) with van der Waals attraction to the surface were selected. Their lateral (to the flow axis) positions were randomly selected, and they were given initial velocities and trajectories dictated by the local flow field. The particles were then subjected to drag, electrical, and van der Waals forces. When the particles approached the membrane to the point where van der Waals forces overcame the electrostatic and hydrodynamic forces, they stuck to the surface.

Figure 21:
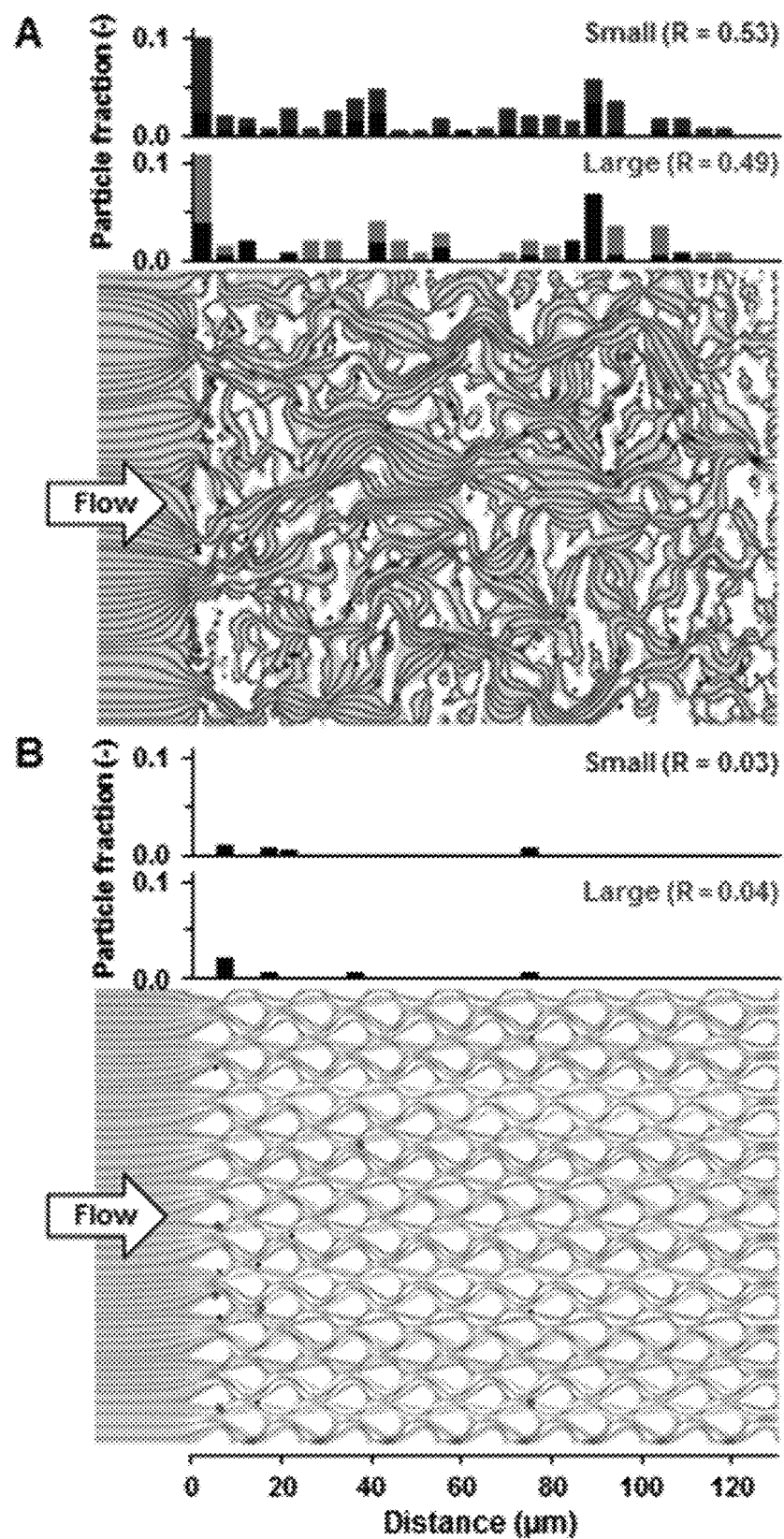
FIG. 21 is a chart showing a binary system of particle tracking for the commercial membrane and the computer-generated teardrop membrane.

The velocity profiles in the two membranes are much different. The teardrop system was designed to have a more uniform velocity distribution, as shown in FIG. 21. Though the maximum velocity was much less than in the commercial membrane, the particles, in the teardrop membrane, were more easily caught up in the flow and dragged toward the outlet of the membrane because the overall average velocity was nearly twice that of the commercial membrane (0.077 vs 0.04 m/s).

Figure 22:
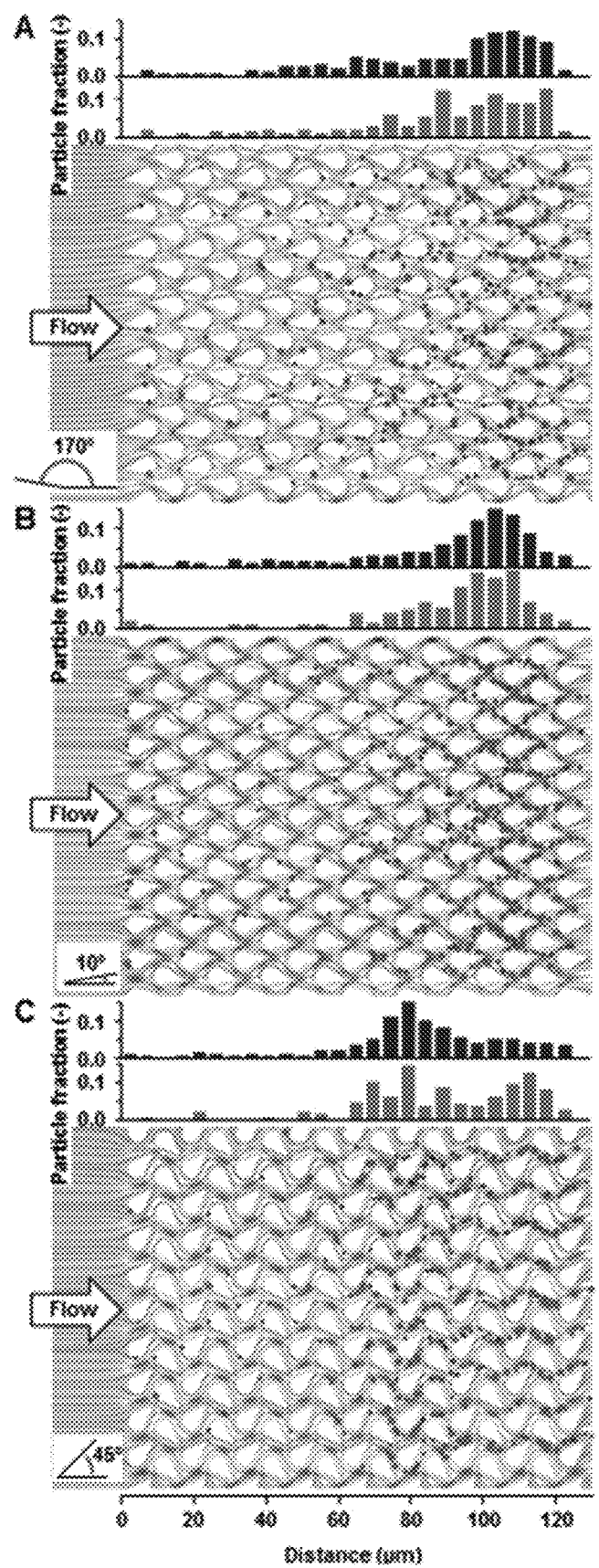
FIG. 22 is a chart showing a binary system of particle tracking in computer-generated teardrop membranes. Membranes: Computer generated, staggered array of teardrop obstructions with three orientations rotated from the axial direction of the flow.

In some embodiments, tortuosity and chemical surface effects were analyzed. To investigate the effect of tortuosity, three computer-generated teardrop membranes were constructed with orientations of ±170°, ±10°, and ±45° relative to the axial direction of the flow, as shown in FIGS. 22A-C, respectively. 300 1 µm diameter and 150 2 µm diameter particles were simultaneously introduced in the same solution as described in FIG. 21B. The orientation of the structures clearly affected the motion of the particles through the membrane as shown by the particle penetration distributions associated with each image. In some embodiments, the particles moved more cohesively through the structure when the bulbous end of the teardrop was oriented towards the membrane inlet (FIG. 22B versus FIG. 22A). Providing a more tortuous path (FIG. 22C) served to spread the particles a bit more and offered a hint at the separation between the large and small particles. More particles were retained (stuck) in this design than the other designs. Thus, the embodiment shown in FIG. 22C shows that an even more tortuous path would be required for further particle separation.

The results of parametric study on the effect of van der Waals forces between the particles and a computer-generated teardrop membrane are shown in FIG. 23. The computer-generated teardrop membrane was the same as that shown in FIG. 21B with $\varphi_0 = -65$ mV and a transmembrane pressure of 14 kPa (~2 psi). 300 1 μm diameter (small circles) and 150 2 μm diameter (large circles) particles were simultaneously introduced in the same solution as described in FIG. 21B. The Hamaker constant, which ranged from $6 \times 10^{-21}$ to $6 \times 10^{-17}$ J, is a measure of the van der Waals attractive force between the particles and the membrane surface, which depends on the particle diameter and the square of the distance between the particle and the wall. In some embodiments, the flow field was held constant to provide insight on the relative strength of particle-wall attractive forces on particle rejection. Particle rejection for the two sizes of particles used in this embodiment are shown in FIG. 23A. The rejection was a strong function of the strength of the intermolecular forces though a relatively weak function of particle size. FIG. 23B shows the average particle velocity for the slowest and fastest moving particles through the 130 μm membrane structure. As used herein, the average velocity is defined as the membrane thickness divided by the particle residence time. The fastest particle velocity was a weak function of the Hamaker constant. This occurs because for this fraction of particles, hydrodynamic forces govern the motion of the particles and these particles occupy regions in the center of the channels forming the open space of the membrane. The slowest particles, where hydrodynamic forces exert much less influence, are greatly affected by the presence of the membrane solid surface. These particles generally adsorb onto the membrane surface. As the intermolecular forces increase, the average velocity of the slower particles also increases. This occurs because the slowest particles adhere to the membrane surface and are removed from the average calculation. At large values of the Hamaker constant, representing strong particle-wall interactions, as more slow-moving particles are captured, the slowest free moving particle residence time approached that of the fastest moving particle, as shown in FIG. 23C. In some embodiments, the velocity of the fastest moving particle had also increased. These results indicate a regime change where intermolecular forces begin to affect all particles within the channels of the synthetic membrane. The boundary delineated by a plot of residence time versus Hamaker constant for the slowest moving particles establishes a phase diagram where above the boundary, particles are captured by the membrane surfaces, and below the boundary, particles permeate entirely through the membrane, as shown in FIG. 23C.

FIG. 24 shows a comparison between the commercial membrane and the hypothetical teardrop structure membrane embodiments. The membrane is a computer-generated, staggered array of teardrop obstructions. Individual rows of teardrops were rotated ±170° from the vertical. 300 1 μm diameter and 150 2 μm diameter particles were introduced together and simultaneously in a 1 mM electrolyte solution in the area directly above the top membrane surface. The membrane wall potential $\varphi_0 = -65$ mV, the particle charge was $Z = -100$, and particle-particle interactions included van der Waals (Hamaker constant, A=10-15 J). The driving pressure at the top face was 14 kPa (~2 psi) and the maximum velocity was 0.2 m/s.

In some embodiments, the computational predictions with the commercial 5 μm mean pore size microporous membrane were compared qualitatively against the mean particle number results obtained from microfiltration using the actual 5 μm mean pore size microporous membrane with a feed containing 0.005% $SiO_2$ particle suspension (of 1 μm mean diameter), as shown in FIG. 25. Using SEM to image the porous flow region with EDS overlay of the silicon signal to specifically identify the $SiO_2$ particles, $SiO_2$ particles residing within the membrane were located and counted with distance from the top face to the bottom face of the membrane (orthogonal to the main flow direction), as shown in FIGS. 25A-C. FIGS. 25D-E show a qualitative comparison of the number of $SiO_2$ particles from the filtration experiments (data is binned every 2 μm or 40 pixels along flow axis) with the computer-generated profile of predicted particle number as a function of membrane depth (x-coordinate) using computational fluid mechanics, respectively. Both sets of results show that the particles were held-up in the first 2-30 μm of the flow path and are qualitatively similar.

Embodiments of the present technology can improve the performance (including the selectivity and/or capacity) of a synthetic membrane though optimal design of the membrane structure and chemistry, species (e.g., particles) transport inside a porous membrane under applied pressure is needed. Some embodiments of the technology include a combined 2D computational fluid and particle drag mechanics model with intermolecular force measurements to study particle intrusion and attachment in the pores of a commercial microporous polymer membrane. Besides providing insight into particle capture and fluid flow within membrane pores, the 2D model qualitatively agrees with filtration experiments, predicts a few dominant flow paths, excessive capture of particles near the entrance or top face of the membrane, and larger numbers of particles in the slower flowing regions. This technology is used to assess the performance of membranes, in some embodiments. Some embodiments show that the internal 2D morphological structure of commercial microporous membranes are poorly designed for optimal fluid flow and particle capture or passage, and hence selectivity and permeation flux. An embodiment of a 2D model according to this technology improves filtration performance. Additional embodiments include three synthetic morphological structures based on a teardrop design that predict the average axial particle velocity and show even exit axial flow across the lateral exit axis and separation between small and large particles, both of which were not observed for commercial microporous membranes. Embodiments also demonstrated that when tortuosity increased, the particle transport was delayed, and when wall attraction increased, with higher Hamaker constants, the fraction of particle capture increased.

Although the technology has been described and illustrated with respect to exemplary embodiments thereof, it should be understood by those skilled in the art that the foregoing and various other changes, omissions, and additions may be made there and thereto, without departing from the spirit and scope of the present technology.

What is claimed is:

1. A method of assessing a membrane, comprising the steps of:
   calculating fluid dynamic characteristics of at least one of a membrane and a material to be passed through the membrane from an inlet end of the membrane to an outlet end of the membrane, where the material comprises particles;

obtaining characteristic of at least one force acting on the particles of the material to be passed through the membrane due to the interaction between the particles and the membrane, the at least one force being an intermolecular force;

combining the calculated fluid dynamic characteristic and the obtained characteristics to assess the flow of the material through the membrane; and optimizing at least one characteristics of the membrane in relation to the material;

wherein the membrane comprises a plurality of rows and a plurality of teardrop structures arranged in the plurality of rows; and wherein the teardrop structures in each row are arranged such that a bulbous end of each teardrop structure is oriented toward the outlet end of the membrane.

2. The method of claim 1, wherein the step of calculating fluid dynamic characteristics comprises computation of the fluid and particle drag mechanics associated with the material in at least two spatial dimensions.

3. The method of claim 2, wherein the step of calculating fluid dynamic characteristics comprises computation of the fluid and particle drag mechanics associated with the material in three spatial dimensions.

4. The method of claim 1, wherein the step of calculating fluid dynamic characteristics comprises computation of the fluid and particle drag mechanics associated with the material in three spatial dimensions.

5. The method of claim 1, wherein the step of obtaining characteristics of at least one force comprises measuring the intermolecular forces between the membrane and the particles.

6. The method of claim 1, wherein the step of optimizing at least one characteristics comprises optimizing the capture or release of particles by the membrane.

7. The method of claim 1, wherein the teardrop structures in each row are arranged at substantially the same angle with respect to an anticipated direction of flow through the membrane.

8. The method of claim 7, further comprising that rows of the teardrop structures in which the structures are at an angle of 10° alternate with rows of the teardrop structure in which the structures are at an angle of −10° relative to the anticipated direction of flow through the membrane.

9. The method of claim 7, further comprising that rows of the teardrop structures in which the structures are at an angle of 45° alternate with rows of the teardrop structure in which the structures are at an angle of −45° relative to the anticipated direction of flow through the membrane.

10. The method of claim 7, further comprising that rows of the teardrop structures in which the structures are at an angle of 70° alternate with rows of the teardrop structure in which the structures are at an angle of −70° relative to the anticipated direction of flow through the membrane.

11. The method of claim 7, further comprising that rows of the teardrop structures in which the structures are at an angle of 170° alternate with rows of the teardrop structure in which the structures are at an angle of −170° relative to the anticipated direction of flow through the membrane.

12. The method of claim 1, wherein the membrane is formed of a microporous hydrophilic polymer material.

13. A microporous membrane, comprising a plurality of rows and a plurality of teardrop structures arranged in the plurality of rows, wherein the teardrop structures in each row are arranged at substantially the same angle with respect to an anticipated direction of flow through the membrane from an inlet end of the membrane to an outlet end of the membrane, and wherein the teardrop structures in each row are arranged such that a bulbous end of each teardrop structure is oriented toward the outlet end of the membrane.

14. The microporous membrane of claim 13, further comprising that rows of the structures in which the structures are at an angle of 10° alternate with rows of the structure in which the structures are at an angle of −10° relative to the anticipated direction of flow through the membrane.

15. The microporous membrane of claim 13, further comprising that rows of the structures in which the structures are at an angle of 45° alternate with rows of the structure in which the structures are at an angle of −45° relative to the anticipated direction of flow through the membrane.

16. The microporous membrane of claim 13, further comprising that rows of the structures in which the structures are at an angle of 70° alternate with rows of the structure in which the structures are at an angle of −70° relative to the anticipated direction of flow through the membrane.

17. The microporous membrane of claim 13, further comprising that rows of the structures in which the structures are at an angle of 170° alternate with rows of the structure in which the structures are at an angle of −170° relative to the anticipated direction of flow through the membrane.

18. The microporous membrane of claim 13, wherein the membrane is formed of a hydrophilic polymer material.

* * * * *